United States Patent
Lee

(10) Patent No.: US 10,809,343 B2
(45) Date of Patent: Oct. 20, 2020

(54) WIRELESS POWER TRANSMISSION METHOD AND DEVICE IN WIRELESS CHARGING SYSTEM

(71) Applicant: LG INNOTEK CO., LTD., Seoul (KR)

(72) Inventor: Jong Heon Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 52 days.

(21) Appl. No.: 16/312,115

(22) PCT Filed: Apr. 10, 2017

(86) PCT No.: PCT/KR2017/003857
§ 371 (c)(1),
(2) Date: Dec. 20, 2018

(87) PCT Pub. No.: WO2018/004116
PCT Pub. Date: Jan. 4, 2018

(65) Prior Publication Data
US 2019/0235041 A1  Aug. 1, 2019

(30) Foreign Application Priority Data

Jun. 29, 2016  (KR) .................. 10-2016-0081393
Aug. 9, 2016  (KR) .................. 10-2016-0101192

(51) Int. Cl.
*G01S 1/68* (2006.01)
*H02J 7/02* (2016.01)
(Continued)

(52) U.S. Cl.
CPC .................................... *G01S 1/68* (2013.01); *H02J 7/02* (2013.01); *H02J 50/12* (2016.02); *H02J 50/80* (2016.02); *H02J 50/90* (2016.02)

(58) Field of Classification Search
CPC ... G01S 1/68; H02J 50/80; H02J 50/90; H02J 50/12; H02J 7/02
See application file for complete search history.

(56) References Cited

U.S. PATENT DOCUMENTS

2005/0047428 A1  3/2005 Park et al.
2014/0062395 A1  3/2014 Kwon et al.
(Continued)

FOREIGN PATENT DOCUMENTS

KR  10-2005-0025053 A  3/2005
KR  10-2013-0128041 A  11/2013
(Continued)

*Primary Examiner* — Robert L Deberadinis
(74) *Attorney, Agent, or Firm* — Birch, Stewart, Kolasch & Birch, LLP

(57) ABSTRACT

The present invention relates to a wireless power transmission method in a wireless charging system supporting electromagnetic resonance and a device therefor. According to one embodiment of the present invention, a wireless power transmission method in a wireless power transmitter wirelessly supplying power to a wireless power receiver through a resonance phenomenon can comprise the steps of: entering a configuration state according to the application of power and performing booting; generating a random first standby offset when the booting is completed; and entering a power saving state at a point in time determined on the basis of the first standby offset, so as to initiate a beacon sequence. Therefore, the present invention has an advantage of enabling power loss caused by cross connection and device damage caused by heat generation in the wireless charging system to be minimized.

17 Claims, 21 Drawing Sheets

(51) Int. Cl.
*H02J 50/12* (2016.01)
*H02J 50/80* (2016.01)
*H02J 50/90* (2016.01)

(56) References Cited

U.S. PATENT DOCUMENTS

| | | |
|---|---|---|
| 2014/0159653 A1 | 6/2014 | Von Novak et al. |
| 2014/0285145 A1 | 9/2014 | Patro et al. |
| 2014/0333145 A1 | 11/2014 | Lee et al. |
| 2014/0347006 A1 | 11/2014 | Kim et al. |
| 2015/0256226 A1 | 9/2015 | Lin et al. |
| 2015/0270740 A1 | 9/2015 | Lee et al. |
| 2016/0049826 A1 | 2/2016 | Lee et al. |
| 2016/0099604 A1 | 4/2016 | Von Novak, III et al. |

FOREIGN PATENT DOCUMENTS

| | | |
|---|---|---|
| KR | 10-2014-0031783 A | 3/2014 |
| KR | 10-2014-0076626 A | 6/2014 |
| KR | 10-2015-0110405 A | 10/2015 |
| KR | 10-2016-0020372 A | 2/2016 |
| WO | WO 2013/172530 A1 | 11/2013 |
| WO | WO 2015/009328 A1 | 1/2015 |

WIRELESS POWER TRANSMISSION METHOD AND DEVICE IN WIRELESS CHARGING SYSTEM

CROSS REFERENCE TO RELATED APPLICATIONS

This application is the National Phase of PCT International Application No. PCT/KR2017/003857, filed on Apr. 10, 2017, which claims priority under 35 U.S.C. 119(a) to Patent Application Nos. 10-2016-0081393, filed in the Republic of Korea on Jun. 29, 2016 and 10-2016-0101192, filed in the Republic of Korea on Aug. 9, 2016, all of which are hereby expressly incorporated by reference into the present application.

TECHNICAL FIELD

Embodiments relate to wireless power transmitting technology, and more particularly, to a wireless power transmitting method and an apparatus therefor, for preventing cross-connection in a wireless charging system for supporting an electromagnetic resonance mode.

BACKGROUND ART

Recently, with rapid development of information and communication technology, a ubiquitous society based on information and communication technology is being established.

In order for information communication devices to be connected anywhere and anytime, sensors with a built-in computer chip having a communication function should be installed in all facilities throughout society. Accordingly, power supply to these devices or sensors is becoming a new challenge. In addition, as the types of mobile devices such as Bluetooth handsets and iPods, as well as mobile phones, rapidly increase in number, charging the battery has required time and effort. As a way to address this issue, wireless power transmission technology has recently drawn attention.

Wireless power transmission (or wireless energy transfer) is a technology for wirelessly transmitting electric energy from a transmitter to a receiver using the induction principle of a magnetic field. In the 1800s, an electric motor or a transformer based on the electromagnetic induction principle began to be used. Thereafter, a method of transmitting electric energy by radiating a high-frequency wave, microwave, or an electromagnetic wave such as radio wave, laser, high frequency wave, and microwave was tried. Electric toothbrushes and some electric shavers are charged through electromagnetic induction.

Wireless energy transmission schemes introduced up to now may be broadly classified into electromagnetic induction, electromagnetic resonance, and RF transmission using a short-wavelength radio frequency.

Thus far, a wireless power transmission method using electromagnetic induction has been mainly used, but a power transmission method using electromagnetic induction is disadvantageous in that an accurate alignment state between a transmission coil as a primary coil and a reception coil as a secondary coil needs to be maintained and a separated distance between the transmission and reception coils, for enabling wireless charging, is short.

On the other hand, a wireless power transmission method using an electromagnetic resonance mode may use a resonance mode of an electromagnetic wave carrying electric energy instead of resonation of sound. To induce resonance, a wireless power transmission device and a wireless power reception device needs to be operated using the same resonance frequency.

The electromagnetic resonance mode has characteristics with low restrictions in the problem in terms of alignment between wireless power transmission and reception coils and a longer separated distance between the transmission and reception coils, for enabling wireless charging, than the electromagnetic induction mode.

A wireless power transmitter and a wireless power receiver may communicate with each other based on predetermined respective modes, for example, a Zig-bee method or a Bluetooth low energy (BLE) method. An out-band method such as a Zig-bee method or a BLE method has characteristics with a longer communicable distance than an in-band communication method that performs communication using the same band as an operation frequency band used in wireless power transmission.

Hereinafter, cross-connection in a conventional wireless charging system of an electromagnetic resonance mode is described in detail with reference to FIG. 10.

As shown in FIG. 10, a first wireless power transmitter TX1 and a second wireless power transmitter TX2 may be disposed. In addition, a first wireless power receiver RX1 may be disposed on the first wireless power transmitter TX1 and a second wireless power receiver RX2 may be disposed on the second wireless power transmitter TX2. To maximize charging efficiency, the first wireless power transmitter TX1 needs to transmit power to the first wireless power receiver RX1 disposed in the vicinity thereof and the second wireless power transmitter TX2 needs to transmit power to the second wireless power receiver RX2 disposed in the vicinity thereof. In this case, the first wireless power transmitter TX1 may communicate with the first wireless power receiver RX1 and the second wireless power transmitter TX2 may communicate with the second wireless power receiver RX2.

Some wireless charging systems for supporting an electromagnetic resonance mode are advantageous in terms of a longer communicable distance and a longer chargeable distance than an electromagnetic induction mode using in-band communication due to use of out-of-band communication. However, there is a problem in that the first wireless power transmitter TX1 and the second wireless power receiver RX2 are communication-linked to each other and the second wireless power transmitter TX2 and the first wireless power receiver RX1 are communication-linked to each other due to an increased communicable distance.

When a communicable distance and a chargeable distance are increased like in an electromagnetic resonance mode, the first wireless power transmitter TX1 and the second wireless power receiver RX2 may be communication-linked to each other and the second wireless power transmitter TX2 and the first wireless power receiver RX1 may be communication-linked to each other. Hereinafter, for convenience of description, this is referred to as cross-connection.

When cross-connection occurs, wireless charging efficiency may be degraded compared with normal communication link and undesirable power may also be received by a wireless power receiver to damage a device.

For example, like in the alliance for wireless power (A4WP) standard, when the first wireless power transmitter TX1 and the second wireless power transmitter TX2 for supporting an electromagnetic resonance mode simultaneously transmit a beacon signal for detecting a wireless power receiver, each of the first wireless power transmitter TX1 and the second wireless power transmitter TX2 may receive an advertisement signal from both the first wireless power receiver RX1 and the second wireless power receiver RX2. In this case, cross-connection may occur.

DISCLOSURE

Technical Problem

Embodiments provide a wireless power transmission method and an apparatus therefor in a wireless charging system for supporting an electromagnetic resonance mode.

Embodiments provide a single type wireless power transmission device that is capable of searching for a wireless power receiver to achieve communication link without cross-connection.

Further, embodiments provide a wireless power transmission method and apparatus for preventing cross-connection.

It is to be understood that both the foregoing general description and the following detailed description of the present disclosure are exemplary and explanatory and are intended to provide further explanation of the present disclosure as claimed.

Technical Solution

In one embodiment, a wireless power transmission method and an apparatus therefor, for preventing cross-connection in a wireless charging system for supporting an electromagnetic resonance mode is provided.

In one embodiment, a wireless power transmissions method of a wireless power transmitter for wirelessly supplying power to a wireless power receiver via resonance includes entering a configuration state to perform booting along with power supply, upon completing the booting, generating random first waiting offset, and entering a power save state to initiate a beacon sequence at a time point determined based on first waiting offset.

Here, the wireless power transmitter may be a single type wireless power transmitter that is communication-linked to one wireless power receiver at any one time to wirelessly transmit power.

The wireless power transmission method may include, simultaneously receiving a plurality of advertisement signals in the power save state, generating random second waiting offset and reinitiating the beacon sequence at a time point determined based on the second waiting offset.

The wireless power transmission method may include, upon receiving an advertisement signal of a first wireless power receiver via out-of-band communication in the power save state, transitioning to a low power state to identify the first wireless power receiver and transitioning to a power transfer state of transmitting power to the identified first wireless power receiver, wherein the power transfer state may transition to the power save state to reinitiate the beacon sequence when the advertisement signal is received from a second wireless power receiver in the power transfer state.

When a predetermined number of advertisement signals are continuously received from the second power receiver, a current state may transition to the power save state.

When an advertisement signal is received from a second wireless power receiver in the power transfer state, third waiting offset may be generated and a current state may transition to the power save state after waiting corresponding to a time corresponding to the third waiting offset.

Here, the third waiting offset may be any one of a random value and a preset fixed value.

The first waiting offset may be generated in such a way that a waiting time determined according to the first waiting offset does not exceed a predetermined maximum waiting time.

The beacon sequence may include at least one of a first beacon sequence that is transmitted with a predetermined first period for detection of an object disposed in a charging region and a second beacon sequence transmitted with a predetermined second period for identifying whether the detected object is a device being capable of wirelessly receiving power.

In another embodiment, a wireless power transmitter for wirelessly supplying power to a wireless power receiver via resonance includes a controller, a waiting offset generation unit for generating random first waiting offset according to a control signal of the controller when booting is completed along with power supply, and a power transmission unit that enters a power save state at a time point determined based on the first waiting offset according to the control signal of the controller to generate and transmit a beacon sequence.

Here, the controller may communication-linked to one wireless power receiver at any one time point to perform control to wirelessly transmit power to a corresponding wireless power receiver.

The wireless power transmitter may further include an out-of-band communication unit for receiving an advertisement signal via out-of-band communication, wherein upon simultaneously receiving the plurality of advertisement signals in the power save state, the controller may control the waiting offset generation unit to generate a random second waiting offset and may control the power transmit to reinitiate the beacon sequence at a time point determined based on second waiting offset.

The wireless power transmitter may further include an out-of-band communication for receiving an advertisement signal via out-of-band communication, wherein upon receiving the advertisement signal of a first wireless power receiver via the out-of-band communication in the power save state, the controller may transition to a low power state to identify a the first wireless power receiver, may control the power transmission unit to transition to a power transfer state for transmitting power to the identified first wireless power receiver and, upon receiving the advertisement signal from a second wireless power receiver in the power transfer state, the controller may control the power transmission unit to transition to the power save state to initiate the beacon sequence.

Upon continuously receiving a predetermined number of advertisement signals from the second wireless power receiver, the controller may control the power transmission unit to transition to the power save state to initiate the beacon sequence.

Upon receiving an advertisement signal from a second wireless power receiver in the power transfer state, the controller may control the waiting offset generation unit to generate third waiting offset and may control the power transmission unit to transition to the power save state to initiate the beacon sequence after waiting by a time period corresponding to the third waiting offset.

The third waiting offset may be any one of a random value and a preset fixed value.

The first waiting offset may be generated in such a way that a waiting time determined according to the first waiting offset does not exceed a predetermined maximum waiting time.

The beacon sequence may include at least one of a first beacon sequence that is transmitted with a predetermined first period for detection of an object disposed in a charging region and a second beacon sequence transmitted with a predetermined second period for identifying whether the detected object is a device being capable of wirelessly receiving power.

In another embodiment, a wireless power transmission method of a wireless power transmitter for wirelessly transmitting power to a wireless power receiver includes supplying power to a wireless power transmitter, setting a first waiting time, and transmitting a request signal for detection or identification of a wireless power receiver, wherein the first waiting time is randomly set, and the transmitting of the request signal is initiated at a time point when the first waiting time elapses from a first specific time point.

Here, the wireless power transmitter may be a wireless power transmitter for simultaneously supplying power only to one wireless power receiver.

The first specific time may be a time point of supplying power.

The first specific time may be a time point when the wireless power transmitter is completely booted.

The first waiting time may be set not to exceed a preset maximum waiting time.

The method may further include receiving an information signal including identification information and characteristic information from the wireless power receiver, setting a second waiting time, and retransmitting the request signal, wherein the second waiting time is randomly set, and the retransmitting of the request signal is initiated at a time point when the second waiting time elapses from a second specific time point.

The second specific time may be a time point of receiving the information signal from the plurality of wireless power receivers.

The second waiting time may be set not to exceed a preset maximum waiting time.

The method may further include transmitting power to a first wireless power receiver, receiving an information signal including identification information and characteristic information from a second wireless power receiver, setting a third waiting time, and retransmitting the request signal.

The third waiting time may be randomly set and the retransmitting of the request signal may be initiated at a time point when the third waiting time elapses from a third specific time point.

The third specific time may be a time point of terminating power transmission with respect to the first wireless power receiver.

An alert alarm may be initiated at the third specific time.

The third waiting time may be set not to exceed a preset maximum waiting time.

In another embodiment, a wireless power transmission method of a wireless power transmitter for wirelessly transmitting power to a wireless power receiver includes transmitting a request signal for detection or identification of a wireless power receiver, receiving an information signal including identification and characteristics information from the wireless power receiver, setting a waiting time, and retransmitting the request signal to the wireless power receiver.

The waiting time may be randomly set and the retransmitting of the request signal may be initiated at a time point when the waiting time elapses from a specific time point.

The wireless power transmitter may be a wireless power transmitter for simultaneously transmitting power only to one wireless power receiver.

The specific time point may be a time point of transmitting the information signal from the plurality of wireless power receivers.

The waiting time may be set not to exceed a preset maximum waiting time.

In another embodiment, a wireless power transmission method of a wireless power transmitter for wirelessly transmitting power to a wireless power receiver includes transmitting a request signal for detection or identification of a wireless power receiver, receiving a first information signal including identification information or characteristic information from a wireless power receiver, transmitting power to the first wireless power receiver, receiving second information including identification information or characteristic information from a second wireless power receiver, setting a waiting time, retransmitting the request signal, wherein the waiting time may be randomly set and the retransmitting of the request signal may be initiated at a time point when the waiting time elapses from a specific time point.

The wireless power transmitter may be a wireless power transmitter for simultaneously transmitting power only to one wireless power receiver.

The specific time point may be a time point of terminating power transmission with respect to the first wireless power receiver.

The waiting time may be set not to exceed a preset maximum waiting time.

In another embodiment, a wireless power transmission method of a wireless power transmitter includes detecting an object disposed in a charging region, upon detecting the object, generating a first pattern code corresponding to the wireless power transmitter, transmitting a first signal including the first pattern code and, upon receiving a second signal including a second pattern code, comparing the first pattern code and the second pattern code to determine a wireless power receiver as a communication link target.

Here, the wireless power transmitter may be a wireless power transmitter for supplying power only to one wireless power receiver at one time.

The first pattern code may be generated using at least one of device identification information corresponding to the wireless power transmitter, power class information, hardware version information, firmware version information, and standard protocol version information.

The device identification information may include at least one of unique serial number information, manufacturer code information, and product code information.

The first signal may be a power signal transmitted through a transmission resonator.

For example, the first signal may be a long beacon signal transmitted to identification of the detected object in a power save state.

The second signal may be received via short range wireless communication.

For example, the second signal may be an advertisement signal that is received via Bluetooth communication in a low power state.

The first pattern code may be encoded using predetermined coding technology and, then, may be modulated and transmitted.

A wireless power receiver corresponding to the second signal with the first pattern code and the second pattern code being the same may be determined as a wireless power receiver as a communication link target.

When the first pattern code and the second pattern code are not the same, the transmitting of the first signal or the detecting of the object may be performed.

In another embodiment, a wireless power transmission method of a wireless power transmitter includes detecting an object disposed in a charging region, upon detecting the object, transmitting a first signal for identification of the detected object through a first frequency band, receiving a second signal corresponding to the first signal through a second frequency band, measuring signal intensity of the received second signal, and determining a wireless power receiver as a communication target based on the measured signal intensity.

The first signal may be a long beacon signal transmitted to identify the detected object in a power save state and the second signal may be an advertisement signal that is received via Bluetooth communication in a low power state.

The measuring of the signal intensity of the received second signal may include verifying whether the number of the second signals received within a predetermined time period after transmission of the first signal is plural and, as the verification result, when the number is plural, measuring a received signal strength indicator (RSSI) corresponding to each of the second signals, wherein a wireless power receiver corresponding to a second signal with a largest RSSI may be determined as a communication target.

The wireless power transmitter may be a wireless power transmitter for supplying power only to one wireless power receiver at one time.

In another embodiment, a wireless power transmission device may include a detector for detecting an object disposed in a charging region, a pattern code generation unit for, upon detecting the object, generating a first pattern code corresponding to the wireless power transmitter, a power transmissions unit for transmitting a first signal including the first pattern code, a communication unit for receiving a second signal including a second code pattern, a comparator for comparing the first pattern code and the second pattern code, and a controller determining a wireless power receiver as a communication link target based on the comparison result.

The controller may perform control to supply power only to one wireless power receiver at one time.

The first pattern code may be generated using at least one of device identification information corresponding to the wireless power transmitter, power class information, hardware version information, firmware version information, and standard protocol version information.

The device identification information may include at least one of unique serial number information, manufacturer code information, and product code information.

The first signal may be a long beacon signal transmitted to identification of the detected object in a power save state.

The second signal may be received via short range wireless communication in a low power state.

The power transmission unit may encode the first pattern code using specific coding technology and may modulate the first pattern code using a predetermined modulation method to generate the long beacon signal.

The controller may determine a wireless power receiver corresponding to the second signal with the first pattern code and the second pattern code being the same as a wireless power receiver as a communication link target.

In another embodiment, a wireless power transmission device includes a detector for detecting an object disposed in a charging region, a power transmission unit for, upon detecting the object, transmitting a first signal for identification of the detected object through a first frequency band, a communication unit for receiving a second signal corresponding to the first signal through a second frequency band, a measurement unit for measuring signal intensity of the received second signal, and a determination unit for determining a wireless power receiver as a communication target based on the measured signal intensity.

The first signal may be a long beacon signal transmitted to identify the detected object in a power save state and the second signal may be an advertisement signal that is received via Bluetooth communication in a low power state.

When the number of the second signals received within a predetermined time period after transmission of the first signal is plural, the measurement unit may measure a received signal strength indicator (RSSI) corresponding to each of the second signals, wherein the determination unit may determine a wireless power receiver corresponding to a second signal with a largest RSSI as a communication target.

The controller may perform control to supply power only to one wireless power receiver at one time.

In another embodiment, a computer readable recording medium may have recorded thereon a program for executing any one of the wireless power transmission methods.

It is to be understood that both the foregoing general description and the following detailed description of the present disclosure are exemplary and explanatory and are intended to provide further explanation of present disclosure as claimed.

Advantageous Effects

A method, an apparatus, and a system according to the present disclosure may have the following effects.

The present disclosure may be advantageous to provide a method of preventing cross-connection in a wireless charging system for supporting an electromagnetic resonance mode and an apparatus therefor.

The present disclosure may be advantageous to provide a single type wireless power transmission device for supporting an electromagnetic resonance mode, for preventing power waste and device damage due to cross-connection.

It will be appreciated by persons skilled in the art that the effects that could be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

Arrangements and embodiments may be described in detail with reference to the following drawings in which like reference numerals refer to like elements and wherein.

BEST MODE

Figure 1:
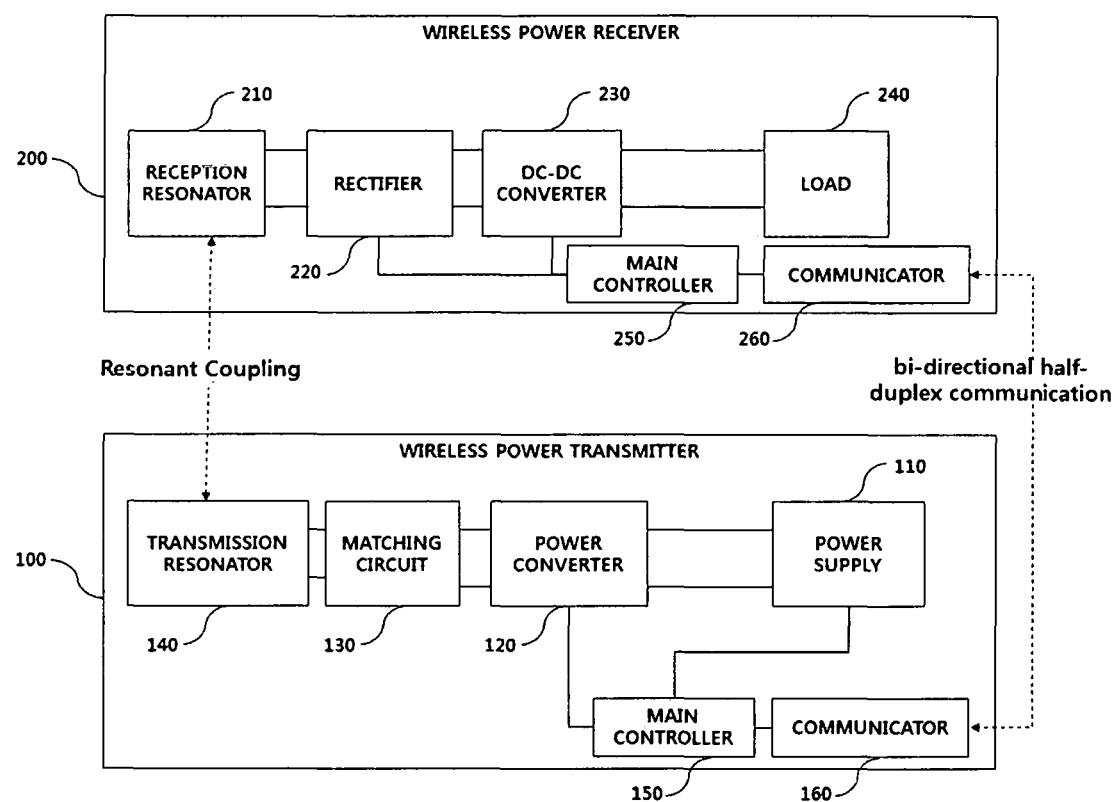
FIG. 1 is a block diagram for explanation of a structure of a wireless power transmission system according to an embodiment of the present disclosure.

According to an embodiment of the present disclosure, a wireless power transmissions method of a wireless power transmitter for wirelessly supplying power to a wireless power receiver via resonance may include entering a configuration state to perform booting along with power supply, upon completing the booting, generating random first waiting offset, and entering a power save state to initiate a beacon sequence at a time point determined based on first waiting offset.

MODE FOR INVENTION

Hereinafter, devices and various methods, to which embodiments of the present disclosure are applied, will be described in more detail with reference to the accompanying drawings. The suffixes "module" and "unit" of elements herein are used for convenience of description and thus can be used interchangeably and do not have any distinguishable meanings or functions.

Although all elements constituting the embodiments of the present disclosure are described as integrated into a single one or to be operated as a single one, the present disclosure is not necessarily limited to such embodiments. According to embodiments, all of the elements may be selectively integrated into one or more and be operated as one or more within the object and the scope of the present disclosure. Each of the elements may be implemented as independent hardware. Alternatively, some or all of the elements may be selectively combined into a computer program having a program module performing some or all functions combined in one or more pieces of hardware. A plurality of code and code segments constituting the computer program may be easily understood by those skilled in the art to which the present disclosure pertains. The computer program may be stored in computer readable media such that the computer program is read and executed by a computer to implement embodiments of the present disclosure. Computer program storage media may include magnetic recording media, optical recording media, and carrier wave media.

The term "comprises", "includes", or "has" described herein should be interpreted not to exclude other elements but to further include such other elements since the corresponding elements may be included unless mentioned otherwise. All terms including technical or scientific terms have the same meanings as generally understood by a person having ordinary skill in the art to which the present disclosure pertains unless mentioned otherwise. Generally used terms, such as terms defined in a dictionary, should be interpreted to coincide with meanings of the related art from the context. Unless differently defined in the present disclosure, such terms should not be interpreted in an ideal or excessively formal manner.

It will be understood that, although the terms first, second, A, B, (a), (b), etc. may be used herein to describe various elements of the present disclosure, these terms are only used to distinguish one element from another element and essential, order, or sequence of corresponding elements are not limited by these terms. It will be understood that when one element is referred to as being "connected to", "coupled to", or "access" another element, one element may be "connected to", "coupled to", or "access" another element via a further element although one element may be directly connected to or directly access another element.

In the following description of the embodiments, for convenience of description, an apparatus for wirelessly transmitting power in a wireless power charging system may be used interchangeably with a wireless power transmitter, a wireless power transmission apparatus, a transmission end, a transmitter, a transmission apparatus, a transmission side, etc.

In addition, an apparatus for wirelessly receiving power from a wireless power transmission apparatus may be used interchangeably with a wireless power reception apparatus, a wireless power receiver, a reception terminal, a reception side, a reception apparatus, a receiver, etc.

A transmitter according to the present disclosure may be configured in the form of a pad, a cradle, an access point (AP), a small base station, a stand, a ceiling insert type, a wall-hanging type, a vehicle insert type, a vehicle mount type, or the like or one transmitter may transmitter may transmit power to a plurality of a wireless power reception apparatus.

To this end, the transmitter may include at least one wireless power transmission element.

In addition, according to the present disclosure, a wireless power transmitter may be operatively network-associated with another wireless power transmitter and a network. For example, wireless power transmitters may be operatively associated with each other using local area wireless communication such as Bluetooth. As another example, wireless power transmitters may be operatively associated with each other using wireless communication technology such as wideband code division multiple access (WCDMA), long term evolution (LTE)/LTE-advanced, and Wi-Fi, without being limited thereto and, thus, may be may be operatively associated with each other through the Internet by wire.

A wireless power transmission element applied to the present disclosure may be an apparatus or component using various wireless power transmission standards based on an electromagnetic induction mode of charging according to the electromagnetic induction principle that a magnetic field is generated from a coil of a power transmission end and electricity is induced from a coil of a reception end under the influence of the magnetic field. Here, the wireless power transmission standards of the electromagnetic induction mode may include wireless charging technology of an electromagnetic induction mode defined in wireless power consortium (WPC) and/or power matters alliance (PMA), without being limited thereto.

As another example, a wireless power transmission element may be an apparatus or component using an electromagnetic resonance mode of synchronizing a magnetic field generated by a transmission coil of a wireless power transmitter with a specific resonance frequency and transmitting power to an adjacently located wireless power receiver. For example, the electromagnetic resonance mode may include wireless charging technology of a resonance method defined in alliance for wireless power (A4WP) as a wireless charging technology standard organization, without being limited thereto.

As another example, a wireless power transmission element may be an apparatus or component using an RF wireless power transmission method of transmitting power to a wireless power receiver positioned a long distance away with a low-energy RF signal.

As another example of the present disclosure, a wireless power transmitter according to the present disclosure may be designed to simultaneously support at least two wireless power transmission methods of the aforementioned electromagnetic induction mode, electromagnetic resonance mode, and RF wireless power transmission method.

In this case, a wireless power transmitter may adaptively determine a wireless power transmission method based on the type, status, required power, and so on of a wireless power receiver as well as capability installed in the wireless power transmitter and the wireless power receiver.

In addition, a wireless power receiver according to an embodiment of the present disclosure may include at least one wireless power reception element and may simultaneously and wirelessly receive power from two or more wireless power transmitters. Here, a wireless power reception element may be an apparatus or component for supporting include at least one of the electromagnetic induction mode, the electromagnetic resonance mode, and the RF wireless power transmission method.

A wireless power receiver according to the present disclosure may be mounted on a small-size electronic apparatus such as a mobile phone, a smartphone, a laptop, a digital broadcasting terminal, a personal digital assistants (PDA), a portable multimedia player (PMP), a navigation system, an MP3 player, an electric toothbrush, a radio frequency identification (RFID) tag, an illumination apparatus, a remote controller, and a bobber, without being limited thereto. Accordingly, the wireless power receiver may be any device as long as the wireless power receiver includes the wireless power reception element according to the present disclosure to wirelessly receive power or to charge a battery. A wireless power receiver according to another embodiment of the present disclosure may also be installed in home appliances including a TV, a refrigerator, a washing machine, etc., a vehicle, an unmanned aerial vehicle, AR. drone, a robot, and so on.

FIG. 1 is a block diagram for explanation of a structure of a wireless power transmission system according to an embodiment of the present disclosure.

Referring to FIG. 1, the wireless power transmission system may include a wireless power transmitter 100 and a wireless power receiver 200.

Although FIG. 1 illustrates the case in which the wireless power transmitter 100 wirelessly transmits power to one wireless power receiver 200, this is merely an embodiment and, thus, according to another embodiment of the present disclosure, the wireless power transmitter 100 may wirelessly transmit power to a plurality of wireless power receivers 200. It is noted that, according to another embodiment of the present disclosure, the wireless power receiver 200 may wirelessly and simultaneously receive power from a plurality of wireless power transmitters 100.

The wireless power transmitter 100 may generate a magnetic field using a specific power transmission frequency and transmit power to the wireless power receiver 200.

The wireless power receiver 200 may receive power in synchronization with the same frequency as a frequency used by the wireless power transmitter 100.

For example, a resonance frequency used for wireless power transmission may be a band of 6.78 MHz, without being limited thereto.

That is, power transmitted by the wireless power transmitter 100 may be transmitted only to the wireless power receiver 200 that resonates with the wireless power transmitter 100.

A maximum number of wireless power receivers 200 capable of receiving power from one wireless power transmitter 100 may be determined based on a maximum transmission power level of the wireless power transmitter 100, a maximum power reception level of the wireless power receiver 200, and physical structures of the wireless power transmitter 100 and the wireless power receiver 200.

The wireless power transmitter 100 and the wireless power receiver 200 may perform bi-directional communication with a different frequency band from a frequency for wireless power transmission, i.e. a resonance frequency band. For example, the bi-directional communication may use a half-duplex Bluetooth low energy (BLE) communication protocol.

The wireless power transmitter 100 and the wireless power receiver 200 may exchange each other's characteristics and state information, i.e. power negotiation information through the bi-directional communication.

For example, the wireless power receiver 200 may transmit predetermined power reception state information for controlling a level of power received from the wireless power transmitter 100 to the wireless power transmitter 100 through bi-directional communication, and the wireless power transmitter 100 may dynamically control a transmitted power level based on the received power reception state information. As such, the wireless power transmitter 100 may optimize power transmission efficiency and may also perform a function of preventing a load from being damaged due to overvoltage, a function of preventing unnecessary power from being wasted due to under voltage, and so on.

The wireless power transmitter 100 may perform a function of authenticating and identifying the wireless power receiver 200 through bi-directional communication, a function of identifying an incompatible apparatus or a non-rechargeable object, a function for identifying a valid load, and so on.

Hereinafter, a wireless power transmission procedure of a resonance method will be described in more detail with reference to FIG. 1.

The wireless power transmitter 100 may include a power supply 110, a power converter 120, a matching circuit 130, a transmission resonator 140, a main controller 150, and a communicator 160. The communicator 160 may include a data transmitter and a data receiver.

The power supply 110 may apply a specific voltage to the power converter 120 under control of the main controller 150. In this case, the applied voltage may be a DC voltage or an AC voltage.

The power converter 120 may convert a voltage received from the power supply 110 into a specific voltage under control of the main controller 150. To this end, the power converter 120 may include at least one of a DC/DC convertor, an AC/DC convertor, and a power amplifier.

The matching circuit 130 may be a circuit for matching impedance between the power converter 120 and the transmission resonator 140 in order to maximize power transmission efficiency.

The transmission resonator 140 may wirelessly transmit power using a specific resonance frequency according to a voltage applied from the matching circuit 130.

The wireless power receiver 200 may include a reception resonator 210, a rectifier 220, a DC-DC converter 230, a load 240, a main controller 250, and a communicator 260. The communicator 260 may include a data transmitter and a data receiver.

The reception resonator 210 may receive power transmitted by the transmission resonator 140 through a resonance phenomenon.

The rectifier 220 may perform a function of converting an AC voltage applied from the reception resonator 210 into a DC voltage.

The DC-DC converter 230 may convert the rectified DC voltage into a specific DC voltage required by the load 240.

The main controller 250 may control operations of the rectifier 220 and the DC-DC converter 230 or may generate the characteristics and state information of the wireless power receiver 200 and may control the communicator 260 to transmit the characteristics and state information of the wireless power receiver 200 to the wireless power transmitter 100. For example, the main controller 250 may monitor output voltages and current intensity of the rectifier 220 and the DC-DC converter 230 and control operations of the rectifier 220 and the DC-DC converter 230.

Information on the monitored output voltages and current intensity may be transmitted to the wireless power transmitter 100 through the communicator 260 in real time.

The main controller 250 may compare the rectified DC voltage with a predetermined reference voltage to determine whether a current state is an overvoltage state or an undervoltage state, and upon detecting a system error state as the determination result, the main controller 250 may transmit the detection result to the wireless power transmitter 100 through the communicator 260.

Upon detecting a system error state, the main controller 250 may control operations of the rectifier 220 and the DC-DC converter 230 or control power supplied to the load 240 using a predetermined overcurrent cutoff circuit including a switch and/or a Zener diode in order to prevent a load from being damaged.

Although FIG. 1 illustrates the case in which the main controller 150 or 250 and the communicator 160 or 260 are configured as different modules, this is merely an embodiment and, thus, according to another embodiment of the present disclosure, it is noted that the main controller 150 or 250 and the communicator 160 or 260 may be configured as one module.

Figure 2:
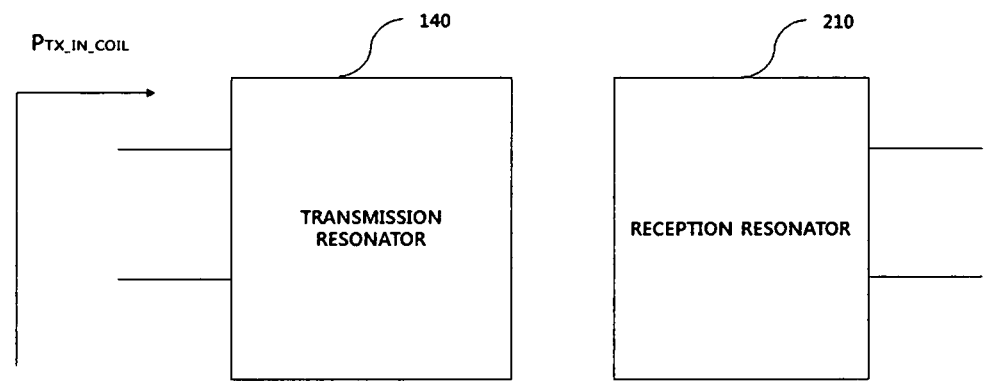
FIG. 2 is a diagram for explanation of the type and characteristics of a wireless power transmitter according to an embodiment of the present disclosure.

FIG. 2 is a diagram for explanation of the type and characteristics of a wireless power transmitter according to an embodiment of the present disclosure.

Types and characteristics of a wireless power transmitter and a wireless power receiver according to the present disclosure may each be classified according to their classes and categories.

The type and characteristics of the wireless power transmitter may be identified through the following three parameters.

First, the wireless power transmitter may be identified by a class determined according to maximum intensity of power applied to the transmission resonator 140.

Here, the class of the wireless power transmitter may be determined by comparing a maximum value of power $P_{TX\_IN\_COIL}$ applied to the transmission resonator 140 with maximum input power $P_{TX\_IN\_MAX}$ that is obviously stated in the following class table (hereinafter, referred to as Table 1) of a wireless power transmitter and is predefined for each class. Here, $P_{TX\_IN\_COIL}$ may be a real number value calculated by dividing a product of voltage (V(t)) and current (I(t)) applied to the transmission resonator 140 per unit time by the corresponding unit time.

TABLE 1

| Class | Maximum input power | Minimum category support requirements | Maximum number of supportable devices |
| --- | --- | --- | --- |
| Class 1 | 2 W | 1 × Class 1 | 1 × Class 1 |
| Class 2 | 10 W | 1 × Class 3 | 2 × Class 2 |
| Class 3 | 16 W | 1 × Class 4 | 2 × Class 3 |
| Class 4 | 33 W | 1 × Class 5 | 3 × Class 3 |
| Class 5 | 50 W | 1 × Class 6 | 4 × Class 3 |
| Class 6 | 70 W | 1 × Class 6 | 5 × Class 3 |

Classes shown in Table 1 above are merely an embodiment, and thus a new class may be added or some classes may be removed. In addition, it is noted that values about maximum input power for each class, minimum category support requirements, and a maximum number of supportable devices may also be changed according to the use, shape, and embodied form of a wireless power transmitter.

For example, as shown in Table 1 above, when a maximum value of power $P_{TX\_IN\_COIL}$ applied to the transmission resonator 140 is equal to or greater than a value of $P_{TX\_IN\_MAX}$ corresponding to class 3 and is smaller than a value of $P_{TX\_IN\_MAX}$ corresponding to class 4, a class of a corresponding wireless power transmitter may be determined as class 3.

Second, the wireless power transmitter may be identified according to minimum category support requirements corresponding to an identified class.

Here, the minimum category support requirements may be the number of supportable wireless power receivers corresponding to a highest level category among categories of a wireless power receiver supportable by a corresponding level of wireless power transmitter. That is, the minimum category support requirements may be a minimum number of maximum category devices supportable by the corresponding wireless power transmitter. In this case, the wireless power transmitter may support all categories of wireless power receives corresponding to a maximum category or less according to the minimum category support requirements.

However, when a wireless power transmitter is capable of supporting a wireless power receiver of a higher category than a category obviously stated in the minimum category support requirements, the wireless power transmitter may not be restricted from supporting a corresponding wireless power receiver.

For example, as shown in Table 1 above, a wireless power transmitter of Class 3 needs to support at least one wireless power receiver of category 5. Needless to say, in this case, the wireless power transmitter may support the wireless power receiver 200 corresponding to a lower category level than a category level corresponding to the minimum category support requirements.

In addition, it is noted that, when it is determined that the wireless power transmitter is capable of supporting a higher category level than a category corresponding to the minimum category support requirements, the wireless power transmitter may also support a wireless power receiver of a higher level.

Third, the wireless power transmitter may be identified by a maximum number of supportable devices corresponding to an identified class. Here, the maximum number of supportable devices may be identified by a maximum number of supportable wireless power receivers (hereinafter, referred to as a maximum number of supportable devices) corresponding to a lowest level category among supportable categories in a corresponding class.

For example, as shown in Table 1 above, a wireless power transmitter of class 3 needs to support a maximum of two wireless power receivers of a minimum category 3.

However, when the wireless power transmitter is capable of supporting a maximum number or more of devices corresponding to a class of the wireless power transmitter, a maximum number or more of devices may not be restricted from being supported.

The wireless power transmitter according to the present disclosure needs to wirelessly transmit power up to at least the number defined in Table 1 within available power unless there is a special reason that does not permit a power transmission request of the wireless power receiver.

For example, when available power for accepting the corresponding power transmission request does not remain, the wireless power transmitter may not permit the power transmission request of the corresponding wireless power receiver. Alternatively, the wireless power transmitter may control power adjustment of the wireless power receiver.

As another example, when a power transmission request, if accepted, exceeds the number of acceptable wireless power receivers, the wireless power transmitter may not permit the corresponding power transmission request of the wireless power receiver.

As another example, when a category of a wireless power receiver that requests power transmission exceeds a category level supportable at a level of the wireless power receiver, the wireless power transmitter may not permit the corresponding power transmission request of the wireless power receiver.

As another example, when an inner temperature exceeds a reference value or more, a wireless power transmitter may not permit the corresponding power transmission request of the wireless power receiver.

Figure 3:
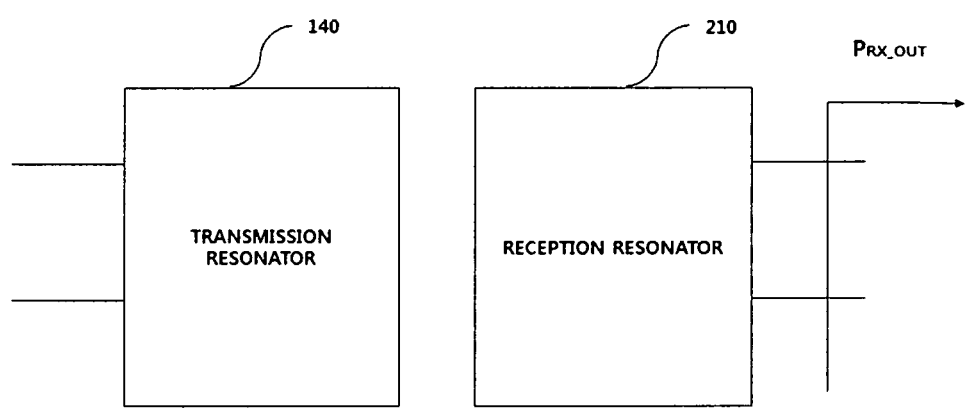
FIG. 3 is a diagram for explanation of the type and characteristics of a wireless power receiver according to an embodiment of the present disclosure.

FIG. 3 is a diagram for explanation of the type and characteristics of a wireless power receiver according to an embodiment of the present disclosure.

As illustrated in FIG. 3, average output power $P_{RX\_OUT}$ of the reception resonator 210 may be a real number value calculated by dividing a product of voltage (V(t)) and current (I(t)) output by the reception resonator 210 for a unit time by the corresponding unit time.

As shown in Table 2 below, a category of the wireless power receiver may be defined based on maximum output power $P_{RX\_OUT\_MAX}$ of the reception resonator 210.

TABLE 2

| Category | Maximum input power | Application example |
| --- | --- | --- |
| Category 1 | TBD | Bluetooth handset |
| Category 2 | 3.5 W | Feature phone |
| Category 3 | 6.5 W | Smartphone |
| Category 4 | 13 W | Tablet |
| Category 5 | 25 W | Small laptop |
| Category 6 | 37.5 W | Laptop |
| Category 6 | 50 W | TBD |

For example, when charging efficiency at a load end is 80% or more, a wireless power receiver of Category 3 may supply power of 5 W to a charging port of the load.

Categories shown in Table 2 above may be merely an embodiment and a new category may be added or some classes may be removed. In addition, it is noted that examples of maximum output power for each category and application shown in Table 2 above may also be modified according to the use, shape, and embodied form of a wireless power receiver.

Figure 4:
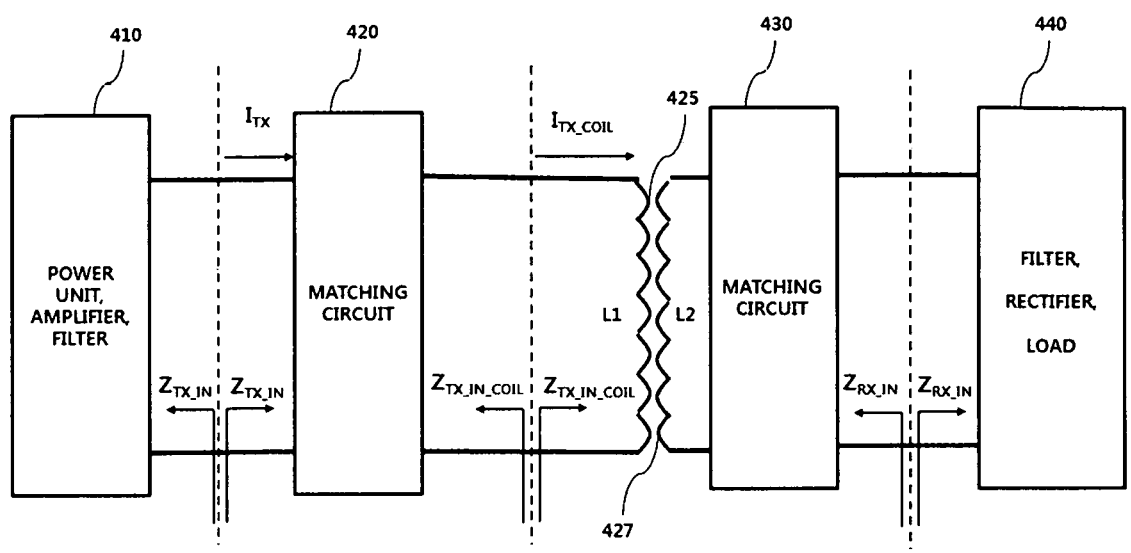
FIG. 4 is an equivalent circuit diagram of a wireless power transmission system according to an embodiment of the present disclosure.

FIG. 4 is an equivalent circuit diagram of a wireless power transmission system according to an embodiment of the present disclosure.

In detail, FIG. 4 illustrates an interface point in an equivalent circuit for measuring reference parameters to be described below.

Hereinafter, the meaning of reference parameters illustrated in FIG. 4 will be described briefly.

$I_{TX}$ and $I_{TX\_COIL}$ may refer to root mean square (RMS) current supplied to a matching circuit (or matching network) 420 of the wireless power transmitter and RMS current supplied to a transmission resonator coil 425 of the wireless power transmitter, respectively.

$Z_{TX\_IN}$ may refer to input impedance of a rear end of a power unit/rectifier/filter 410 of the wireless power transmitter and input impedance of a front end of the matching circuit 420.

$Z_{TX\_IN\_COIL}$ may refer to input impedance of a rear end of the matching circuit 420 and a front end of the transmission resonator coil 425.

L1 and L2 may refer to an inductance value of the transmission resonator coil 425 and an inductance value of a reception resonator coil 427, respectively.

$Z_{RX\_IN}$ may refer to input impedance of a rear end of a matching circuit 430 of a wireless power receiver and a front end of a filter/rectifier/load 440 of a wireless power receiver.

According to an embodiment of the present disclosure, a resonance frequency used in an operation of a wireless power transmission system may be 6.78 MHz±15 kHz.

In addition, a wireless power transmission system according to an embodiment of the present disclosure may provide simultaneous charging, i.e. multi-charging, to a plurality of wireless power receivers, and in this case, even if a new wireless power receiver is added or a wireless power receiver is removed, a reception power variation amount of a maintained wireless power receiver may be controlled not to exceed a predetermined reference value or more. For example, a reception power variation amount may be, without being limited to, ±10%.

According to a condition for maintaining the reception power variation amount, a wireless power receiver that is added to a charging region or is removed may not overlap with an existing wireless power receiver.

When the matching circuit 430 of the wireless power receiver is connected to a rectifier, a real part of $Z_{TX\_IN}$ may have an inverse relationship with load resistance of a rectifier (hereinafter, referred to as $R_{RECT}$) That is, increase in $R_{RECT}$ may reduce $Z_{TX\_IN}$ and reduction in $R_{RECT}$ may increase $Z_{TX\_IN}$.

According to the present disclosure, resonator coupling efficiency may be a maximum power reception ratio calculated by dividing power transmitted to a load 440 from a reception resonator coil by power carried in a resonance frequency band by the transmission resonator coil 425. Resonator coupling efficiency between the wireless power transmitter and the wireless power receiver may be calculated when reference port impedance $Z_{TX\_IN}$ of a transmission resonator and a reference port impedance $Z_{RX\_IN}$ of a reception resonator are completely matched with each other.

Table 3 below shows an example of minimum resonator coupling efficiency according to a class of a wireless power transmitter and a class of a wireless power receiver according to an embodiment of the present disclosure.

When power is applied to the wireless power transmitter, the wireless power transmitter may transition to the configuration state 510. The wireless power transmitter may transition to the power save state 520 when a predetermined reset timer expires in the configuration state 510 or the initialization procedure is completed.

In the power save state 520, the wireless power transmitter may generate a beacon sequence and transmit the same through a resonant frequency band.

Here, the wireless power transmitter may control the beacon sequence to be initiated within a predetermined time after entering the power save state 520. For example, the wireless power transmitter may control the beacon sequence to be initiated within 50 ms after transition to the power save state 520, without being limited thereto.

In the power save state 520, the wireless power transmitter may periodically generate and transmit a first beacon sequence for detection of an object positioned in a charging region, i.e., the object being a wide concept including conductive impurities as well as a wireless power receiver, and may detect impedance variation of a reception resonator, i.e. load variation. Hereinafter, for convenience of description, a first beacon and a first beacon sequence will be referred to as a short beacon or a short beacon sequence, respectively.

In particular, the short beacon sequence may be repeatedly generated and transmitted with a predetermined time interval $t_{CYCLE}$ for a short period $t_{SHORT\_BEACON}$ so as to save standby power of the wireless power transmitter before the object is detected. For example, $t_{SHORT\_BEACON}$ may be set to 30 ms or less and $t_{CYCLE}$ may be set to 250 ms±5 ms without being limited thereto. In addition, current intensity of each short beacon may be a predetermined reference value or more and may be gradually increased for a predetermined time. For example, minimum current intensity of a short beacon may be set to be sufficiently high so as to detect a wireless power receiver of Category 2 or more of Table 2.

According to the present disclosure, a wireless power transmitter may include a predetermined sensing element for detection of change in reactance and resistance by a reception resonator according to reception of a short beacon.

In addition, in the power save state 520, the wireless power transmitter may periodically generate and transmit a second beacon sequence, i.e., a long beacon sequence, for supplying sufficient power required for booting and response of the wireless power receiver. Hereafter, for convenience of

TABLE 3

|         | Category 1 | Category 2 | Category 3 | Category 4 | Category 5 | Category 6 | Category 7 |
|---------|------------|------------|------------|------------|------------|------------|------------|
| Class 1 | N/A        | N/A        | N/A        | N/A        | N/A        | N/A        | N/A        |
| Class 2 | N/A        | 74% (−1.3) | 74% (−1.3) | N/A        | N/A        | N/A        | N/A        |
| Class 3 | N/A        | 74% (−1.3) | 74% (−1.3) | 76% (−1.2) | N/A        | N/A        | N/A        |
| Class 4 | N/A        | 50% (−3)   | 65% (−1.9) | 73% (−1.4) | 76% (−1.2) | N/A        | N/A        |
| Class 5 | N/A        | 40% (−4)   | 60% (−2.2) | 63% (−2)   | 73% (−1.4) | 76% (−1.2) | N/A        |
| Class 5 | N/A        | 30% (−5.2) | 50% (−3)   | 54% (−2.7) | 63% (−2)   | 73% (−1.4) | 76% (−1.2) |

When a plurality of wireless power receivers is used, minimum resonator coupling efficiency corresponding to class and category shown in Table 3 above may be increased.

Figure 5:
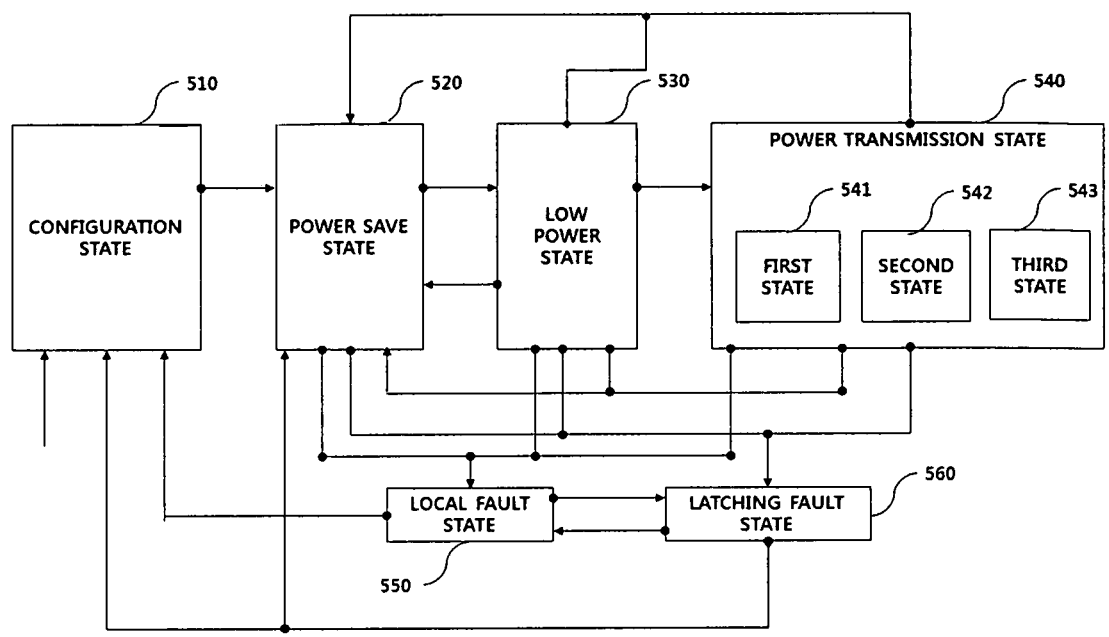
FIG. 5 is a state transition diagram for explanation of a state transition procedure of a wireless power transmitter according to an embodiment of the present disclosure.

FIG. 5 is a state transition diagram illustrating a state transition procedure in a wireless power transmitter according to an embodiment.

Referring to FIG. 5, a state of the wireless power transmitter may include a configuration state 510, a power save state 520, a low power state 530, a power transfer state 540, a local fault state 550, and a latching fault state 560.

description, the second beacon and the second beacon sequence will be referred to as a long beacon and a long beacon sequence, respectively.

That is, when booting is completed through the second beacon sequence, the wireless power receiver may broadcast a predetermined response signal to the wireless power transmitter through an out-of-band communication channel.

In particular, In particular, the long beacon sequence may be generated and transmitted with a predetermined time interval $t_{LONG\_BEACON\_PERIOD}$ for a relatively long period compared with a short beacon sequence to supply sufficient power required for booting of the wireless power receiver. For example, $t_{LONG\_BEACON}$ may be set to 105 ms+5 ms, $t_{LONG\_BEACON\_PERIOD}$ may be set to 850 ms, and current intensity of a long beacon may be relatively high compared with current intensify of the short beacon. In addition, the long beacon may be maintained with power of predetermined intensity during a transmission period.

Then, the wireless power transmitter may be on standby to receive a predetermined response signal during a transmission period of the long beacon after detecting change in impedance of a reception resonator. Hereinafter, for convenience of description, the response signal will be referred to as an advertisement signal. Here, the wireless power receiver may broadcast the advertisement signal through a different out-of-band communication frequency band from a resonance frequency band.

For example, the advertisement signal may include at least one or any one of message identification information for identifying a message defined in a corresponding out-of-band communication standard, unique service or wireless power receiver identification information for identifying whether a wireless power receiver is a proper receiver or a compatible receiver to a corresponding wireless power transmitter, output power information of a wireless power receiver, information on rated voltage/current applied to a load, antenna gain information of a wireless power receiver, information for identifying a category of a wireless power receiver, authentication information of a wireless power receiver, information on whether an over voltage protection function is installed, and version information of software installed in a wireless power receiver.

Upon receiving an advertisement signal, the wireless power transmitter may transition to the low power state 530 from the power save state 520 and, then, may establish an out-of-band communication link with a wireless power receiver. Continuously, the wireless power transmitter may perform a registration procedure to a wireless power receiver through the established out-of-band communication link. For example, when out-of-band communication is Bluetooth low-power communication, the wireless power transmitter may perform Bluetooth pairing with the wireless power receiver and the transmitter and the receiver exchange at least one of state information, characteristics information, and control information with each other through the paired Bluetooth link.

When the wireless power transmitter transmits a predetermined control signal, i.e. a predetermined control signal for requesting a wireless power receiver to transmit power to a load, for initializing charging through out-of-band communication in the low power state 530 to the wireless power transmitter, the wireless power transmitter may transition to the power transfer state 540 from the low power state 530.

When an out-of-band communication link establishment procedure or registration procedure is not normally completed in the low power state 530, the wireless power transmitter may transition to the power save state 520 from the low power state 530.

The wireless power transmitter may drive a separately divided link expiration timer for connection with each wireless power receiver and the wireless power receiver needs to transmit a predetermined message indicating that the receiver is present to the wireless power transmitter with a predetermined time before the link expiration timer expires. Here, the link expiration timer may be reset whenever the message is received and an out-of-band communication link established between the wireless power receiver and the wireless power receiver may be maintained when the link expiration timer does not expire.

When all link expiration timers corresponding to out-of-band communication links established between a wireless power transmitter and at least one wireless power receiver expire in the low power state 530 or the power transfer state 540, the wireless power transmitter may transition to the power save state 520.

Upon receiving a valid advertisement signal from the wireless power receiver, the wireless power transmitter in the low power state 530 may drive a predetermined registration timer. In this case, when a registration timer expires, a wireless power transmitter in the low power state 530 may transition to the power save state 520. In this case, the wireless power transmitter may output a predetermined notification signal indicating registration failure through a notification display element, e.g. including an LED lamp, a display screen, and a beeper, included in the wireless power transmitter.

When all connected wireless power receivers are completely charged in the power transfer state 540, the wireless power transmitter may transition to the low power state 530.

In particular, the wireless power receiver may permit registration of a new wireless power receiver in the remaining states except for the configuration state 510, the local fault state 550, and the latching fault state 560.

In addition, the wireless power transmitter may dynamically control transmitted power based on state information received from the wireless power receiver in the power transfer state 540.

In this case, receiver state information transmitted to the wireless power transmitter from the wireless power receiver may include at least one of required power information, information on voltage and/or current measured at a rear end of a rectifier, charging state information, information for announcing over current, over voltage, and/or overheating states, and information indicating whether an element or device for shutting off or reducing power transmitted to a load is activated according to over current or over voltage. In this case, the receiver state information may be transmitted at a predetermined period or may be transmitted whenever a specific event occurs. In addition, the element for shutting off or reducing power transmitted to a load according over current or over voltage may be provided using at least one of an ON/OFF switch and a Zener diode.

According to another embodiment, the receiver state information transmitted to the wireless power transmitter from the wireless power receiver may further include at least one of information indicating that external power is connected to the wireless power receiver by wire and information indicating that an out-of-band communication mode is changed, e.g. near field communication (NFC) may be changed to Bluetooth low energy (BLE) communication.

According to another embodiment, a wireless power transmitter may adaptively determine intensity of power to be received for each wireless power receiver based on at least one of current available power of the wireless power transmitter, priority for each wireless power receiver, and the number of connected wireless power receivers. Here, the intensity of power to be transmitted for each wireless power receiver may be determined as a ratio for receiving power based on maximum power to be processed by a rectifier of a corresponding wireless power receiver.

The wireless power transmitter may transmit a predetermined power adjustment command containing information on the determined power intensity to the corresponding wireless power receiver. In this case, the wireless power receiver may determine whether power is capable of being controlled in the power intensity determined by the wireless power transmitter and may transmit the determination result to the wireless power transmitter through a predetermined power adjustment response message.

According to another embodiment, the wireless power receiver may transmit predetermined receiver state information indicating whether wireless power adjustment is possible according to the power adjustment command of the wireless power transmitter prior to reception of the power adjustment command.

The power transfer state 540 may be any one of a first state 541, a second state 542, and a third state 543 according to a power reception state of a connected wireless power receiver.

For example, the first state 541 may refer to a state in which power reception states of all wireless power receivers connected to the wireless power transmitter are each a normal voltage state.

The second state 542 may refer to a state in which a power reception state of at least one wireless power receiver connected to the wireless power transmitter is a low voltage state and a wireless power receiver of a high voltage state is not present.

The third state 543 may refer to a state in which a power reception state of at least one wireless power receiver connected to the wireless power transmitter is a high voltage state.

Upon detecting system error in the power save state 520, the low power state 530, or the power transfer state 540, the wireless power transmitter may transition to the latching fault state 560.

Upon determining that all connected wireless power receivers are removed from a charging region, the wireless power transmitter in the latching fault state 560 may transition to the configuration state 510 or the power save state 520.

In addition, upon detecting local fault in the latching fault state 560, the wireless power transmitter may transition to the local fault state 550. Here, when local fault is released, the wireless power transmitter in the local fault state 550 may re-transition to the latching fault state 560.

On the other hand, when the wireless power transmitter transitions to the local fault state 550 from any one of the configuration state 510, the power save state 520, the low power state 530, and the power transfer state 540, if local fault is released, the wireless power transmitter may transition to the configuration state 510.

When the wireless power transmitter transitions to the local fault state 550, power supplied to the wireless power transmitter may be shut off. For example, upon detecting fault such as over voltage, over current, and overheating, the wireless power transmitter may transition to the local fault state 550, without being limited thereto.

For example, upon detecting over voltage, over current, overheating, or the like, the wireless power transmitter may transmit a predetermined power adjustment command for reducing intensity of power received by the wireless power receiver to at least one connected wireless power receiver.

As another example, upon detecting over voltage, over current, overheating, or the like, the wireless power transmitter may transmit a predetermined control command for stopping charging of the wireless power receiver to at least one connected wireless power receiver.

Through the aforementioned power adjustment procedure, the wireless power transmitter may prevent a device from being damaged due to over voltage, over current, overheating, or the like.

When intensity of output current of a transmission resonator is a reference value or more, the wireless power transmitter may transition to the latching fault state 560. In this case, the wireless power transmitter having transitioned to the latching fault state 560 may attempt to adjust the intensity of the output current of the transmission resonator to a reference value or less for a predetermined time. Here, the attempt may be repeatedly performed a predetermined number of times. Despite repeated performance, when the latching fault state 560 is not released, the wireless power transmitter may transmit a predetermined notification signal indicating that the latching fault state 560 is not released, to a user using a predetermined notification element. In this case, when all wireless power receivers positioned in the charging region of the wireless power transmitter are removed by the user, the latching fault state 560 may be released.

On the other hand, when intensity of output current of a transmission resonator is reduced to a reference value or less within a predetermined time or the intensity of output current of the transmission resonator is reduced to a reference value or less during the predetermined repeated performance, the latching fault state 560 may be automatically released, and in this case, the wireless power transmitter may automatically transition to the power save state 520 from the latching fault state 560 and may re-perform detection and identification procedures on the wireless power receiver.

The wireless power transmitter in the power transfer state 540 may transmit consecutive power and may adaptively control the transmitted power based on state information of the wireless power receiver and a predefined optimal voltage region setting parameter.

For example, the optimal voltage region setting parameter may include at least one of a parameter for identifying a low voltage region, a parameter for identifying an optimal voltage region, a parameter for identifying a high voltage region, and a parameter for identifying an over voltage region.

When a power reception state of the wireless power receiver is in a low voltage region, the wireless power transmitter may increase transmitted power, and when the power reception state is in a high voltage region, the wireless power transmitter may reduce transmitted power.

The wireless power transmitter may control transmitted power to maximize power transmission efficiency.

The wireless power transmitter may control transmitted power such that a deviation of a power amount required by the wireless power receiver is a reference value or less.

In addition, when an output voltage of a rectifier of a wireless power receiver reaches a predetermined over voltage region, i.e. when an over voltage is detected, the wireless power transmitter may stop power transmission.

Figure 6:
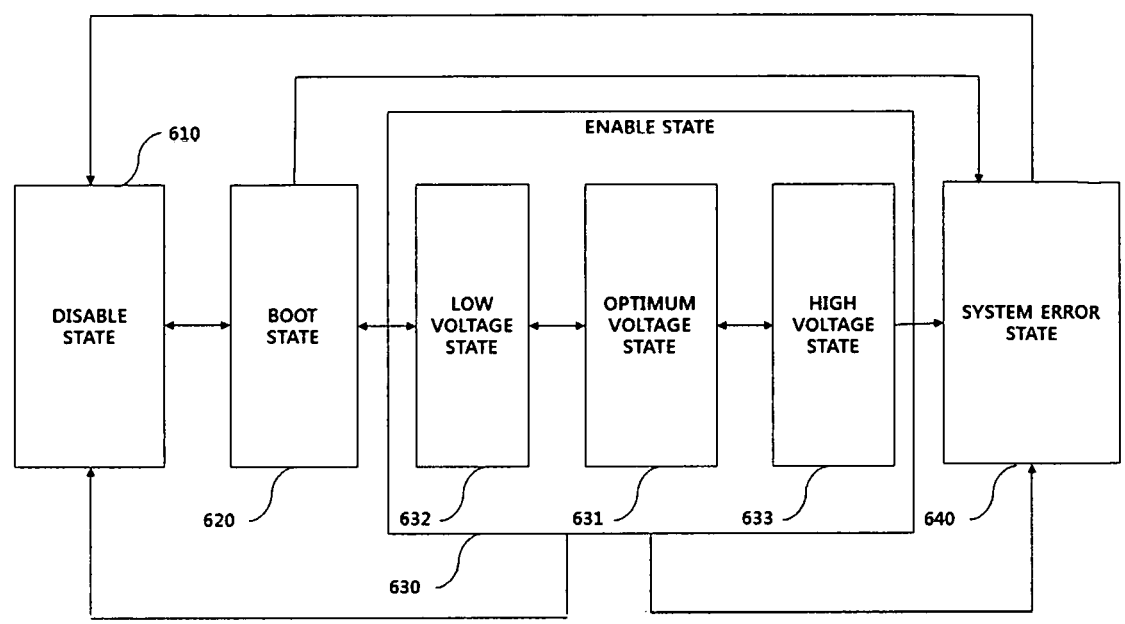
FIG. 6 is a state transition diagram of a wireless power receiver according to an embodiment of the present disclosure.

FIG. 6 is a state transition diagram of a wireless power receiver according to an embodiment of the present disclosure.

Referring to FIG. 6, a state of the wireless power receiver may largely include a disable state 610, a boot state 620, an enable state 630 (or an on state), and a system error state 640.

In this case, the state of the wireless power receiver may be determined based on intensity (hereinafter, for convenience of description, referred to as $V_{RECT}$) of an output voltage at an end of a rectifier of the wireless power receiver.

The enable state 630 may be divided into an optimum voltage state 631, a low voltage state 632, and a high voltage state 633 according to a value of $V_{RECT}$.

When a measured value of $V_{RECT}$ is equal to or greater than a predetermined value of $V_{RECT\_BOOT}$, the wireless power receiver in the disable state 610 may transition to the boot state 620.

In the boot state 620, the wireless power receiver may establish an out-of-band communication link with the wireless power transmitter and may stand by until a value of $V_{RECT}$ reaches power required at an end of a load.

Upon checking that the value of $V_{RECT}$ reaches power required at the end of the load, the wireless power receiver in the boot state 620 may transition to the enable state 630 and may begin charging.

Upon checking that charging is completed or stopped, the wireless power receiver in the enable state 630 may transition to the boot state 620.

Upon detecting predetermined system error, the wireless power receiver in the enable state 630 may transition to the system error state 640. Here, the system error may include other predefined system error conditions as well as overvoltage, overcurrent, and overheating.

When a value of $V_{RECT}$ is reduced to a value of $V_{RECT\_BOOT}$ or less, the wireless power receiver in the enable state 630 may transition to the disable state 610.

In addition, when a value of $V_{RECT}$ is reduced to a value of $V_{RECT\_BOOT}$ or less, the wireless power receiver in the boot state 620 or the system error state 640 may transition to the disable state 610.

Hereinafter, state transition of the wireless power receiver in the enable state 630 will be described with reference to FIG. 7.

Figure 7:
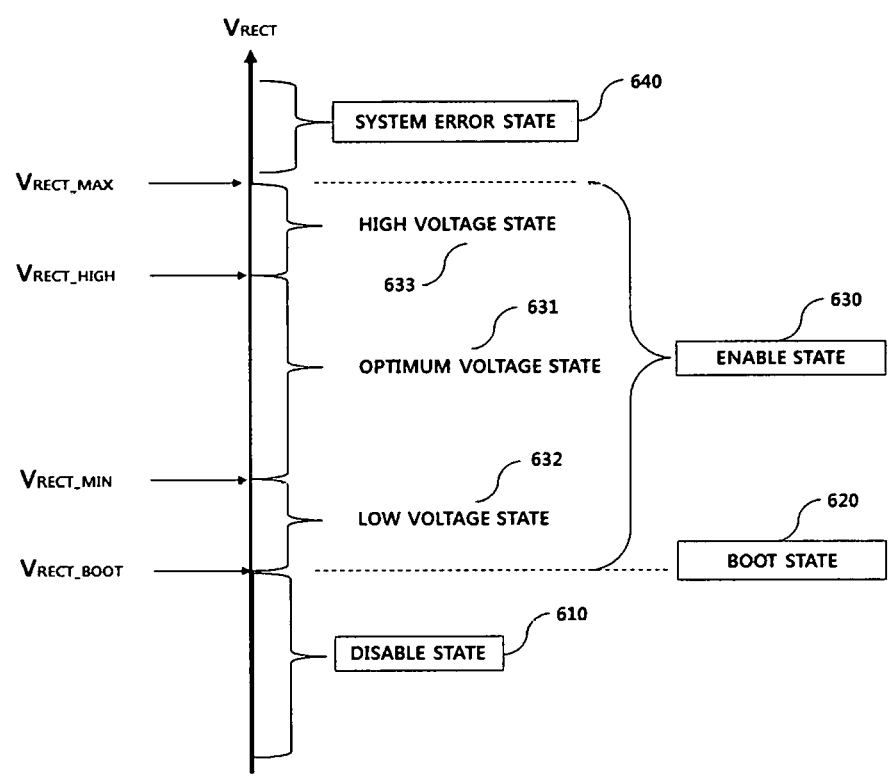
FIG. 7 is a diagram for explanation of an operating region of a wireless power receiver according to VRECT according to an embodiment of the present disclosure.

FIG. 7 is a diagram for explanation of an operating region of a wireless power receiver according to $V_{RECT}$ according to an embodiment of the present disclosure.

Referring to FIG. 7, when a value of $V_{RECT}$ is less than a predetermined value of $V_{RECT\_BOOT}$, the wireless power receiver may be maintained in the disable state 610.

Then, when a value of $V_{RECT}$ is increased to $V_{RECT\_BOOT}$ or more, the wireless power receiver may transition to the boot state 620 and may broadcast an advertisement signal within a predetermined time. Then, upon detecting the advertisement signal, the wireless power transmitter may transmit a predetermined connection request signal for establishment of an out-of-band communication link to the wireless power receiver.

When the out-of-band communication link is normally established and registration is successful, the wireless power receiver may stand by until a value of $V_{RECT}$ reaches a minimum output voltage (hereinafter, for convenience of description, referred to as $V_{RECT\_MIN}$) at a rectifier for normal charging.

When a value of $V_{RECT}$ exceeds $V_{RECT\_MIN}$, the wireless power receiver may transition to the enable state 630 from the boot state 620 and begin charging of a load.

When a value of $V_{RECT}$ exceeds a predetermined reference value $V_{RECT\_MAX}$ for determination of an overvoltage in the enable state 630, the wireless power receiver may transition to the system error state 640 from the enable state 630.

Referring to FIG. 7, the enable state 630 may be divided into a low voltage state 632, an optimum voltage state 631, and a high voltage state 633 according to a value of $V_{RECT}$.

The low voltage state 632 may refer to a state of $V_{RECT\_BOOT} \leq V_{RECT} \leq V_{RECT\_MIN}$, the optimal voltage state 631 may refer to a state of $V_{RECT\_MIN} < V_{RECT} \leq V_{RECT\_HIGH}$ and the high voltage state 633 may refer to a state of $V_{RECT\_HIGH} < V_{RECT} \leq V_{RECT\_MAX}$.

In particular, the wireless power receiver having transitioned to the high voltage state 633 may postpone an operation for shutting off power supplied to a load for predetermined time (hereinafter, for convenience of description, referred to as high voltage state holding time). In this case, the high voltage state holding time may be predetermined such that the wireless power receiver and the load are not adversely affected in the high voltage state 633.

When the wireless power receiver transitions to the system error state 640, the wireless power receiver may transmit a predetermined message indicating overvoltage generation to the wireless power transmitter through an out-of-band communication link within predetermined time.

In addition, the wireless power receiver may control a voltage applied to a load using an overvoltage interruption element that is installed for preventing a load from being damaged in the system error state 640. Here, the overvoltage interruption element may be an ON/OFF switch and/or a Zener diode.

In the aforementioned embodiment, although a countermeasure method and element for system error in a wireless power receiver when an overvoltage is generated in the wireless power receiver and the wireless power receiver transitions to the system error state 640 has been described this is merely an embodiment and, thus, according to another embodiment of the present disclosure, the wireless power receiver may also transition to a system error state due to overheating, overcurrent, etc. in the wireless power receiver.

For example, when the wireless power receiver transitions to a system error state due to overheating, the wireless power receiver may transmit a predetermined message indicating overheating generation to the wireless power transmitter. In this case, the wireless power receiver may drive an included cooling fan or the like so as to reduce internally generated heat.

According to another embodiment of the present disclosure, the wireless power receiver may be operatively associated with a plurality of wireless power transmitters so as to wirelessly receive power. In this case, upon determining that a wireless power transmitter that is determined to actually wirelessly receive power is different from a wireless power transmitter with an out-of-band communication link that is actually established, the wireless power receiver may transition to the system error state 640.

Figure 8:
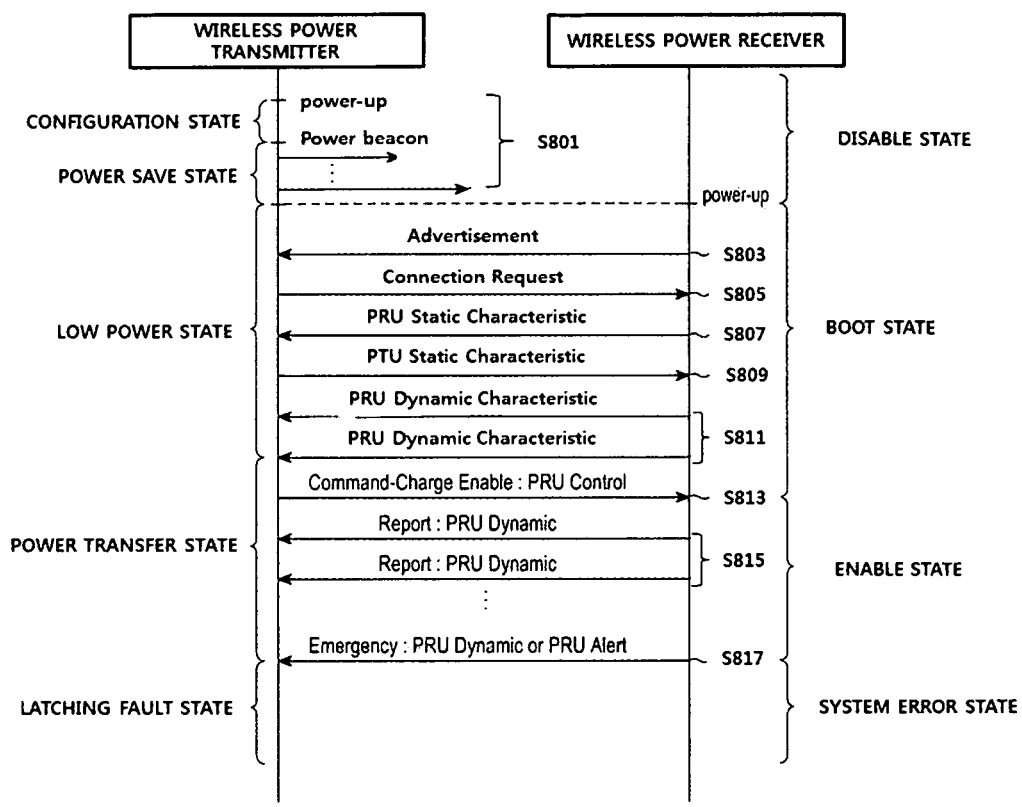
FIG. 8 is a flowchart for explanation of a wireless charging procedure according to an embodiment of the present disclosure.

FIG. 8 is a flowchart for explanation of a wireless charging procedure in a wireless charging system for supporting an electromagnetic resonance mode according to an embodiment of the present disclosure.

Referring to FIG. 8, when booting and configuration are completed according to power application, a wireless power transmitter may transition to a power save state to generate a beacon sequence and to transmit the beacon sequence through a transmission resonator (S801).

Upon detecting the beacon sequence, a wireless power receiver may be powered on to transition to a boot state and may broadcast an advertisement signal including identification information and characteristic information of the corresponding wireless power receiver, for searching for a wireless power transmitter (S803). In this case, the advertisement signal may be repeatedly transmitted with a predetermined period until a connection request signal to be described below is received from the wireless power transmitter.

Upon receiving the advertisement signal, the wireless power transmitter may transmit a predetermined connection request signal for establishing out-of-band communication link with a corresponding wireless power receiver to the wireless power receiver (S805).

Upon receiving the connection request signal, the wireless power receiver may establish the out-of-band communication link and may transmit a PRU static characteristic message thereof through the established out-of-band communication link (S807).

Here, the PRU static characteristic message of the wireless power receiver may include at least one of category information, hardware and software version information, maximum rectifier output power information, initial reference parameter information for power control, information on required voltage or power, information for identifying whether a power adjustment function is installed, information on a supportable out-of-band communication method, information on a supportable power control algorithm, and information on an initially set voltage value of a preferred end of a rectifier in a wireless power receiver.

Upon receiving the PRU static characteristic message of the wireless power receiver, the wireless power transmitter may transmit the PRU static characteristic message of the wireless power transmitter to the wireless power receiver through out-of-band communication link (S809).

Here, the PRU static characteristic message of the wireless power transmitter may include at least one of transmitter power information, class information, hardware and software version information, information on the maximum number of supportable wireless power receivers and/or information on the number of currently connected wireless power receivers.

Then, the wireless power receiver may monitor real-time power reception state and state of charge thereof and, when a periodic or specific event occurs, a dynamic characteristic message may be transmitted to the wireless power transmitter (S811).

Here, the dynamic characteristic message of the wireless power receiver may include at least one of information on voltage and current output from a rectifier, information on voltage and current applied to a load, information on internally measured temperature of a wireless power receiver, reference parameter change information for power control (a minimum value of commutation voltage, a maximum value of commutation voltage, and an initially set variation value of voltage of a preferred end of a rectifier), information on a state of charge, system fault information, and alert information.

When sufficient power for charging the wireless power receiver is prepared, the wireless power transmitter may transition to a power transfer state and may transmit a predetermined control command through out-of-band communication link to control the wireless power receiver to initiate charging (S813). Upon receiving a wireless power receiver (PRU) control message for initiating charging, the wireless power receiver may transition to the enable state from the boot state.

Then, the wireless power transmitter may dynamically control transmitted power based on the dynamic characteristic message that is periodically received from the wireless power receiver (S815).

When internal system error is detected or charging is completed, the wireless power receiver may transmit data for identifying corresponding system error and/or data indicating that charging is completed to the wireless power transmitter through an alert field included in the dynamic characteristic message or a separate wireless power receiver (PRU) alert message (S817). Here, the data transmitted through the alert field or the alert message may include overcurrent, overvoltage, overtemperature, self protection of a wireless power receiver, charging completion, wired charging detection, mode transition, and so on, without being limited thereto.

When information included in the dynamic characteristic message or the PRU Alert message is a message indicating that specific system error occurs, the wireless power transmitter may transition to a latching fault state from a power transfer state. Needless to say, when system error is detected in the enable state, the wireless power receiver may transition to a system error state.

Figure 9:
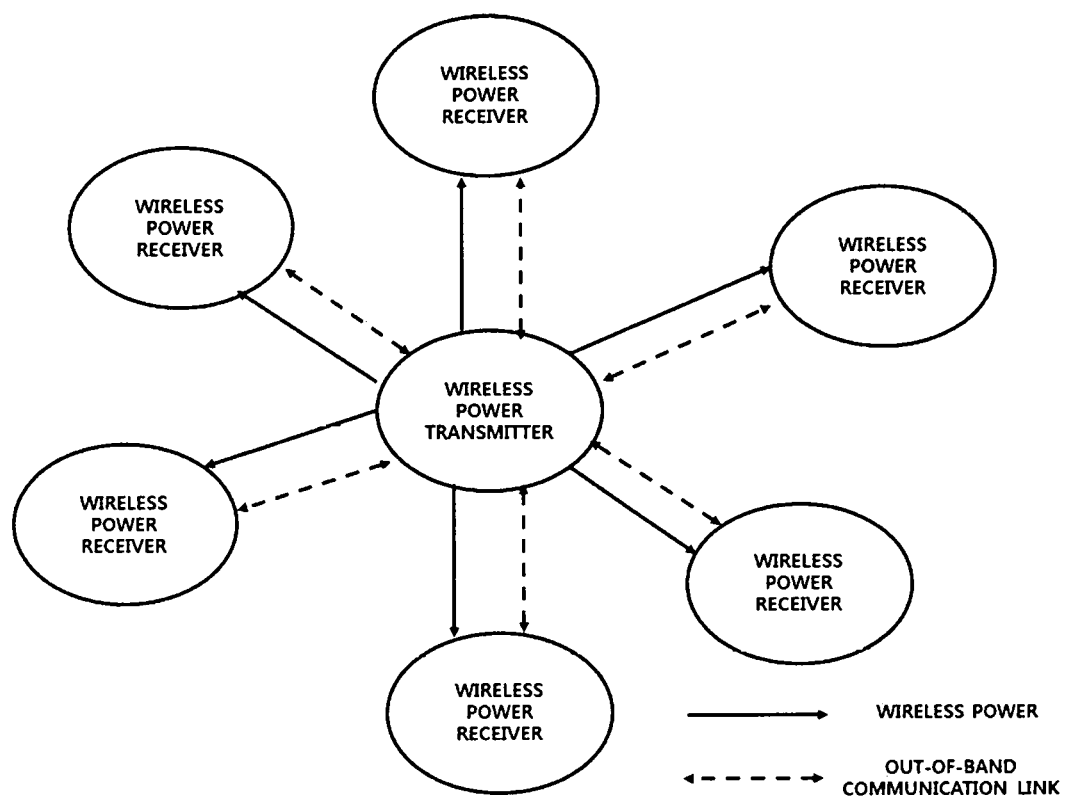
FIG. 9 is a diagram illustrating a configuration of a wireless power transmission system according to an embodiment of the present disclosure.

FIG. 9 is a diagram illustrating a configuration of a wireless power transmission system according to an embodiment of the present disclosure.

As illustrated in FIG. 9, the wireless power transmission system may be configured with a star topology, without being limited thereto.

The wireless power transmitter may collect information on various characteristics and state information from the wireless power receiver through an out-of-band communication link and control operating and transmission power of the wireless power receiver based on the collected information.

In addition, the wireless power transmitter may transmit characteristics information of the wireless power transmitter and a predetermined control signal to the wireless power receiver through the out-of-band communication link.

The wireless power transmitter may determine a power transmission order for each wireless power receiver of a connected wireless power receiver and may wirelessly transmit power according to the determined power transmission order. For example, the wireless power transmitter may determine the power transmission order based on at least one of a category of the wireless power receiver, a pre-allocated priority for each wireless power receiver, power reception efficiency of the wireless power receiver or power transmission efficiency of the wireless power transmitter, minimum resonator coupling efficiency between the wireless power transmitter and the wireless power receiver, charging efficiency of a load, a charging state of the wireless power receiver, and whether system error occurs for each wireless power receiver.

The wireless power transmitter may determine a power amount to be transmitted for each connected wireless power receiver. For example, the wireless power transmitter may calculate power amount to be transmitted for each wireless power receiver based on a currently available power amount, power reception efficiency for each wireless power receiver, etc. and transmit information on the calculated power amount to the wireless power receiver through a predetermined control message.

Upon detecting change in a wireless charging state, for example, when a new wireless power receiver is added to a charging region, when a wireless power receiver that is already being charged is removed from the charging region, when a wireless power receiver that is already being charged is completely charged, and when system error of a wireless power receiver that is already being charged is detected, the wireless power transmitter may initiate a power redistribution procedure. In this case, the power redistribution result may be transmitted to the wireless power receiver through a predetermined control message.

In addition, the wireless power transmitter may generate a time synchronization signal for acquiring time synchronization with wireless power receiver(s) connected via a network and provide the time synchronization signal. Here, the time synchronization signal may be transmitted through a frequency band, i.e. in-band, for wirelessly transmitting power or a frequency band, i.e. out-of-band, for performing out-of-band communication. The wireless power transmitter and the wireless power receiver may manage communication timing and communication sequence of each other based on the time synchronization signal.

Thus far, although the configuration in which the wireless power transmission system including one wireless power transmitter and a plurality of wireless power receivers is connected via a network via star topology has been described with reference to FIG. 9, this is merely an embodiment and, thus, according to another embodiment of the present disclosure, the wireless power transmission system may be configured in such a way that a plurality of wireless power transmitters and a plurality of wireless power receivers are connected via a network to wirelessly transmit and receive power. In this case, the wireless power transmitter may transmit state information of the wireless power transmitter and/or state information of a wireless power receiver connected to the wireless power transmitter to another wireless power transmitter connected via a network through a separate communication channel. In addition, when the wireless power receiver is a movable device, the wireless power receiver may be controlled to receive seamless power by the wireless power receiver that is being moved through handover with the wireless power transmitter.

When one wireless power receiver simultaneously and wirelessly receives power from a plurality of wireless power transmitters during a handover procedure, the wireless power receiver may sum power received from each wireless power transmitter and calculate estimated time until a load is completely charged based on the summed power. That is, the wireless power receiver or an electronic apparatus connected to the wireless power receiver may adaptively calculate estimated time of charging completion according to handover and may control a display screen to display the estimated time.

The wireless power transmitter may be operated as a network coordinator and may exchange information with the wireless power receiver through an out-of-band communication link. For example, the wireless power transmitter may receive various information items of the wireless power receiver to generate and manage a predetermined device control table and transmit network management information to the corresponding wireless power receiver based on the device control table. As such, the wireless power transmitter may generate a network of the wireless power transmission system and maintain the network.

A wireless power transmission system according to another embodiment of the present disclosure may include a plurality of single type wireless power transmitters and wireless power receivers. Here, the single type wireless power transmitter may refer to a device that is always communication-linked to one wireless power receiver to perform power transmission. The single type wireless power transmitter for supporting the A4WP standard may be communication-linked to the wireless power receiver corresponding to a first received advertisement signal to initiate power transmission.

Hereinafter, for convenience of description, differently from the single type wireless power transmitter, a wireless power transmitter that is connected to a plurality of wireless power receivers at one time to transmit power is referred to as a multi-type wireless power transmitter.

Figure 10:
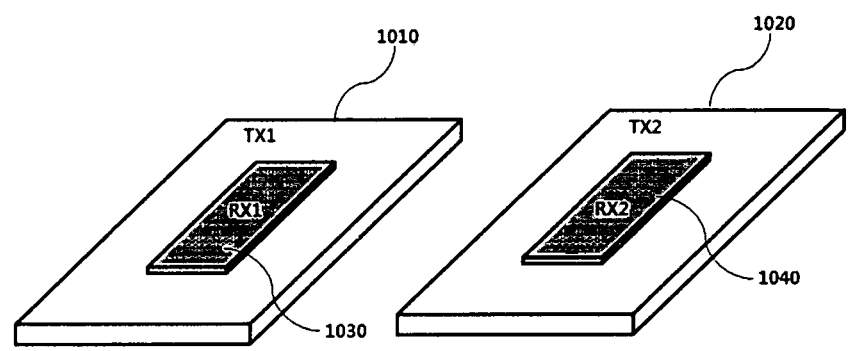
FIG. 10 is a diagram for explanation of a problem in terms of cross-connection in a single type wireless power transmitter according to the present disclosure.

FIG. 10 is a diagram for explanation of a problem in terms of cross-connection in a single type wireless power transmitter according to the present disclosure.

Hereinafter, it may be noted that a first wireless power transmitter (TX1) 1010 and a second wireless power transmitter (TX2) 1020 shown in FIG. 10 are each a single type wireless power transmitter.

When power is simultaneously supplied to the TX1 1010 and the TX2 1020 in a conventional wireless charging system, the TX1 1010 and the TX2 1020 may be completely booted at almost the same time and may initiate a beacon sequence for detection and identification of a wireless power receiver at almost the same time.

In this case, a first wireless power receiver (RX1) 1030 and a second wireless power receiver (RX2) 1040 may be booted using the received beacon signal and may generate a response signal corresponding to the beacon signal, e.g., an advertisement signal defined in the A4WP standard, and may broadcast the response signal through a out-of-band communication channel at almost the same time.

Hereinafter, an example in which a response signal corresponding to a beacon signal for detection of a wireless power receiver is an advertisement signal defined in the A4WP standard is described.

In addition, for convenience of description, a response signal corresponding to a long beacon signal for detection or identification of a wireless power receiver is interchangeably used with a second signal.

When a first advertisement signal-hereinafter referred to as a1 for convenience of description-broadcast by the RX1 1030 is pre-received by the TX2 1020 compared with the TX1 1010 and, a second advertisement signal—hereinafter referred to as a2 for convenience of description—transmitted by the RX2 1040 is pre-received by the TX1 1010 compared with the TX2 1020, cross-connection may occur.

For example, when cross-connection occurs, power transmitted by the TX2 1020 is not normally received by the RX1 1030 and, thus, the RX1 1030 may make a request to the TX2 1020 for transmission a large amplitude of power through an out-of-band communication channel. In this case, overheating may occur in the RX2 1040 disposed a charging region of the TX2 1020.

Figure 11:
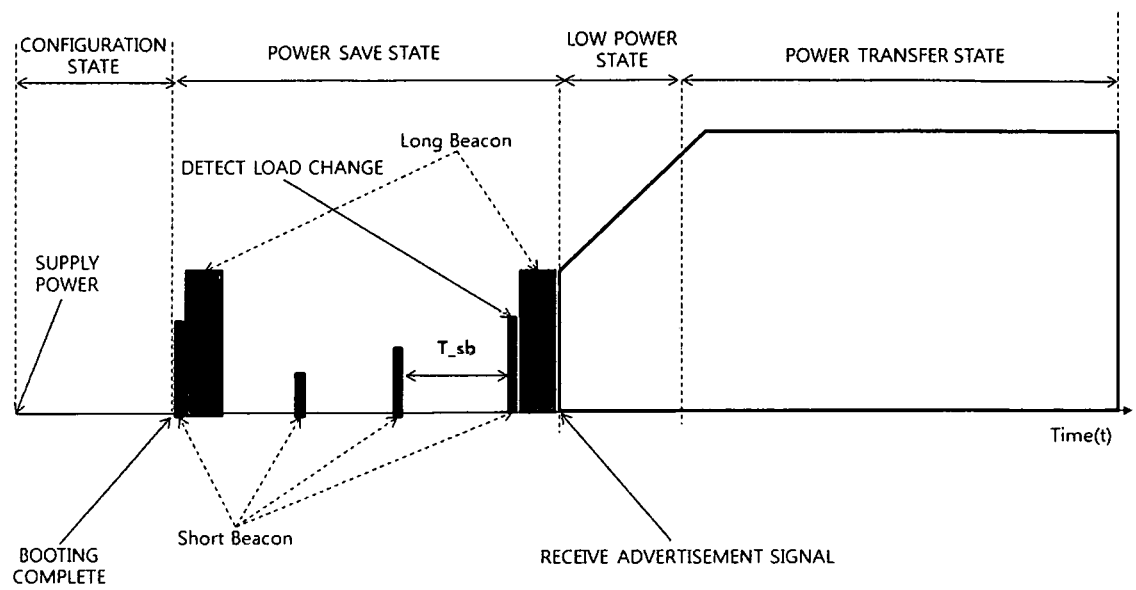
FIG. 11 is a diagram for explanation of a wireless power transmission procedure in a wireless power transmitter according to an embodiment of the present disclosure.

FIG. 11 is a diagram for explanation of a wireless power transmission procedure in a wireless power transmitter according to an embodiment of the present disclosure.

Referring to FIG. 11, when power is supplied to the wireless power transmitter, the wireless power transmitter may enter a configuration state to initiate a booting procedure. When booting is completed, the wireless power transmitter may enter a power save state to initiate a preset beacon sequence transmission procedure.

When a load change is detected during transmission of a beacon sequence, the wireless power transmitter may enter the low power state to initiate a registration procedure with respect to the corresponding wireless power receiver. In this case, the wireless power transmitter may receive an advertisement signal from the wireless power receiver and may attempt communication link with the corresponding wireless power receiver.

When the normal communication link and registration are completed with respect to the wireless power receiver, the wireless power transmitter may enter the power transfer state to initiate charging.

When a load change is not detected in the power save state or the advertisement signal is not received after a long beacon is transmitted according to detection in the load change, the wireless power transmitter may restart the beacon sequence transmission procedure.

For example, a long beacon and a short beacon may be transmitted with a predetermined period in the power save state. In this case, a period for transmitting the long beacon and a period for transmitting the short beacon may be transmitted. In particular, in the case of the short beacon, intensity of transmitted power is changed every transmission period by each level, but the preset disclosure is not limited thereto and, thus, power with the same intensity may be transmitted.

When presence of impurities are detected in the charging area in the power save state, at least one of a transmission of the long beacon and/or the short beacon, intensity of transmitted power, and amplitude of transmitted power during a unit time.

For example, when impurities are detected in the power save state, the wireless power transmitter may change the long beacon and (or) the short beacon in such a way that a transmission period is increased compared with the case before impurities are detected.

As another example, when impurities are detected in the power save state, the wireless power transmitter may the long beacon and (or) the short beacon in such a way that a transmission period is lowered compared with the case before impurities are detected.

A method of preventing cross-connection by a single type wireless power transmitter based on the arrangement of FIG. 10 is described below with reference to FIGS. 12 and 13.

Figure 12:
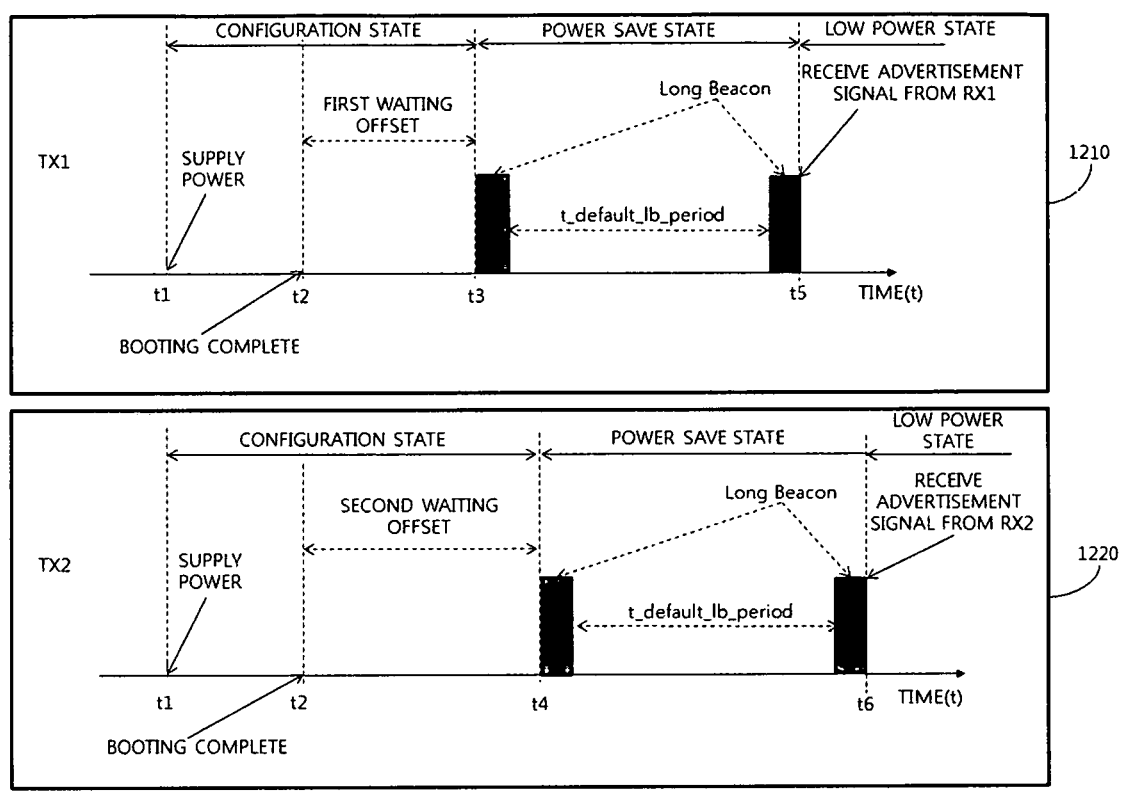
FIG. 12 is a diagram for explanation of a beacon signal transmission method for preventing cross-connection by a wireless power transmitter according to an embodiment of the present disclosure.

FIG. 12 is a diagram for explanation of a beacon signal transmission method for preventing cross-connection by a wireless power transmitter according to an embodiment of the present disclosure.

According to an embodiment of the present disclosure, when power is supplied to the wireless power transmitter and booting is completed, waiting time—hereinafter referred to as waiting offset for convenience of description—may be arbitrarily and randomly determined to transition to the power save state from the configuration state. Needless to say, a maximum wasting time that is time corresponding to maximum waiting and a waiting offset unit may be predefined and may be maintained in a predetermined memory of a wireless power transmitter. That is, the wireless power transmitter may arbitrarily determine waiting time within the maximum waiting time.

According to the corresponding wireless charging standard rule for products complying with the wireless charging standard, maximum allowable time until a beacon sequence is initiated when power is supplied and, then, booting is completed may be defined. In this case, when the randomly determined waiting offset corresponds to excessively large waiting time, the waiting offset may exceed the maximum allowable time. Accordingly, it may be important to perform control to select waiting offset within the predetermined maximum waiting time.

Accordingly, transition time points of transition to the power save state in a plurality of wireless power transmitters to which power is supplied at the same time may be different, and transmission time points of beacon signals based thereon may be different. For example, the random waiting offset may be generated a predetermined random value generation function, without being limited thereto. In addition, an initial value, i.e., a seed value, input to the random value generation function may be determined based on at least one or at least one combination of a device serial number for uniquely identifying the corresponding wireless power transmitter, manufacturing year/month/date, software version information installed in the corresponding wireless power transmitter, and a class.

As shown in reference numerals 1210 and 1220 of FIG. 12, when power is simultaneously supplied to the TX1 and the TX2 at time point t1, bottoming may be simultaneously completed at a time point t2, waiting offset may be randomly determined, and a current state may transition to the power save state after waiting by the determined waiting offset. In this case, when waiting offsets determined by the TX1 and the TX2 are different, i.e., when first waiting offset and second waiting offset are differently determined, time points when the TX1 and the TX2 begin to transmit a beacon signal may be different. Accordingly, even if the RX1 and the RX2 are simultaneously disposed on the charging region of the TX1 and the TX2, time points when the TX1 and the TX2 detect presence of an object, i.e., time points when a load change is detected may be different. In addition, time points of transmitting a long beacon signal to identify a receiver after the object is detected may be different in the TX1 and the TX2. In this case, the long beacon signal may be transmitted with a preset default long beacon period (t_default_lb_period).

In particular, a beacon signal transmitted by a specific wireless power transmitter may be received by only a wireless power receiver disposed in a chargeable region of the corresponding wireless power transmitter. The wireless power receiver may be booted using power received through the beacon signal and may broadcast an advertisement signal for a communication link with the wireless power transmitter after booting.

As shown in reference numeral 1210 of FIG. 12, the beacon signal transmitted by the TX1 may be received by on the beacon signal and the TX1 may receive the advertisement signal transmitted by the RX1 at time point t5 may transition to the low power state. The advertisement signal a1 transmitted through an out-of-band communication channel may also be received by the TX2. However, since an object has not been detected, the TX2 may ignore the received advertisement signal a1.

As shown in reference numeral 1220 of FIG. 12, the beacon signal transmitted by the TX2 may b received by only the RX 2 and the TX2 may receive the advertisement signal a1 transmitted by the R2 at time point t6 and may transition to the low power state. The advertisement signal a2 of the RX2, transmitted through an out-of-band communication channel, may also be received by the TX1. However, the TX1 as the single type wireless power transmitter already transitions to the low power state and, thus, may ignore the received a2.

The wireless power transmitter according to an embodiment of the present disclosure of FIG. 12, in particular, a plurality of wireless power transmitters and a plurality of wireless power receivers may be installed and used at a short distance, thereby preventing cross-connection that occurs when many people collectively use the wireless power transmitters and the wireless power receivers and simultaneously supply power thereto.

Figure 13:
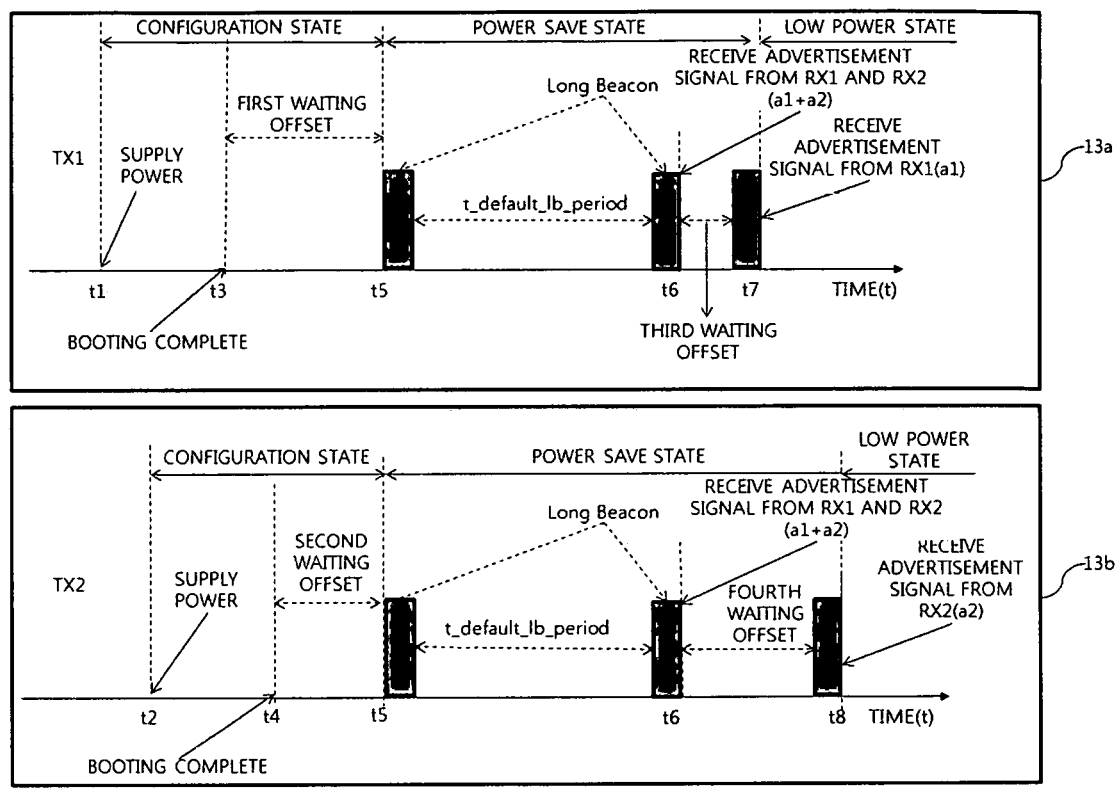
FIG. 13 is a diagram for explanation of a beacon signal transmission method for preventing cross-connection by a wireless power transmitter according to another embodiment of the present disclosure.

FIG. 13 is a diagram for explanation of a beacon signal transmission method for preventing cross-connection by a wireless power transmitter according to another embodiment of the present disclosure.

As shown in reference numerals 13a and 13b of FIG. 13, time points of supplying power in the TX1 and the TX2 may be different, i.e., t1 and t2, respectively. In this case, time points of completing booting in the configuration state may be different in the TX1 and the TX2. When the TX1 and the TX2 are completely booted, waiting offset for transition to the power save state may be randomly determined. Hereinafter, for convenience of description, waiting offsets that are randomly determined by the TX1 and the TX2 are referred to as first waiting offset and second waiting offset, respectively.

As shown in reference numerals 13a and 13b, time points for transition to the power save state based on the determined first waiting offset and second waiting offset in the TX1 and the TX2 may be the same, i.e., t5. In this case, since time points when beacon signal begins to be transmitted may be the same in the TX1 and the TX2, the TX1 and the TX may receive the advertisement signals a1 and a2 transmitted by the RX1 and the RX2 at time point t6. Upon detecting an object and, then, receiving an advertisement signal from a plurality of wireless power receivers, the TX1 and the TX2 that are each a single type wireless power transmitter may randomly determine a time point of transmitting a next long beacon signal.

As shown in reference numerals 13a and 13b, upon receiving a plurality of advertisement signals at time point t6, the TX1 and the TX2 may determine waiting offset for transmission of a next long beacon as third waiting offset and fourth waiting offset, respectively. When the third waiting offset and the fourth waiting offset are different and the fourth waiting offset is greater than the third waiting offset, the TX1 may receive the advertisement signal a1 from the RX1 to transition to the low power state at time point t7 and the TX2 may receive the advertisement signal a2 from the RX2 to transition to the low power state at time point t8.

As seen from the aforementioned embodiment shown in FIGS. 12 and 13, the single type wireless power transmission device according to an embodiment of the present disclosure may be advantageous to prevent cross-connection of a wireless power receiver irrespective of a time point of supplying power. As such, the present disclosure may be advantageous to prevent unnecessary power waste and heating.

Figure 14:
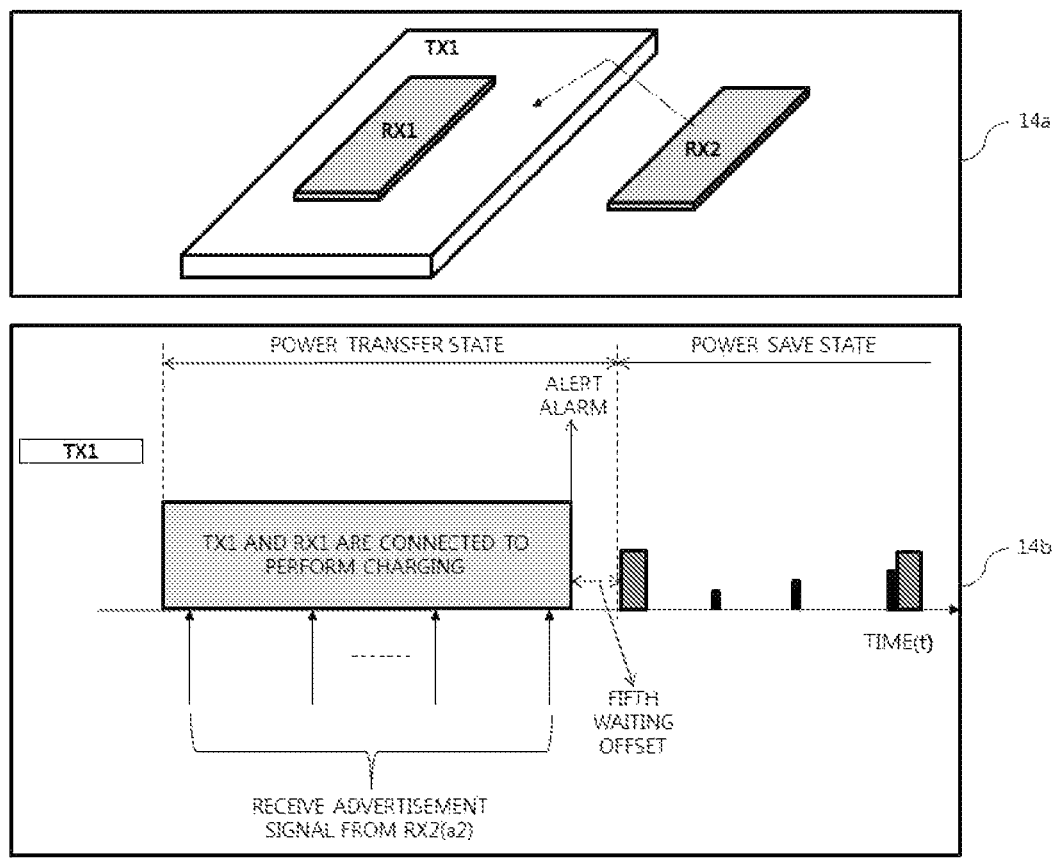
FIG. 14 is a diagram for explanation of a power transmission control method by a single type wireless power transmitter according to an embodiment of the present disclosure.

FIG. 14 is a diagram for explanation of a power transmission control method by a single type wireless power transmitter according to an embodiment of the present disclosure.

As shown in reference numeral 14a of FIG. 14, the RX1 may be disposed in a charging region of the TX1 and, in the charging state, the RX2 may be positioned in the charging area of the TX1. In this case, as shown in reference numeral 14b, while transmitting power to the RX1 in the power transfer state, the TX1 may repeatedly receive the advertisement signal a2 generated by the RX2 with a predetermined period through an out-of-band communication channel.

According to an embodiment, when the number of continuously received advertisement signals a2 is greater than a predetermined reference value, the TX1 may stop power transmission to the RX1 and may output a predetermined alert alarm signal indicating that a plurality of wireless power receivers are disposed in the charging region.

Then, the TX1 may transition to the power save state and may perform detection and identification procedures of the wireless power receiver.

According to an embodiment, when a time corresponding to fifth waiting offset elapses after transmission of the alert alarm signal, the TX1 may transition to the power save state and may initiate a beacon sequence.

Here, the fifth waiting offset may be randomly determined, without being limited thereto and, thus, may be set to any fixed value.

Figure 15:
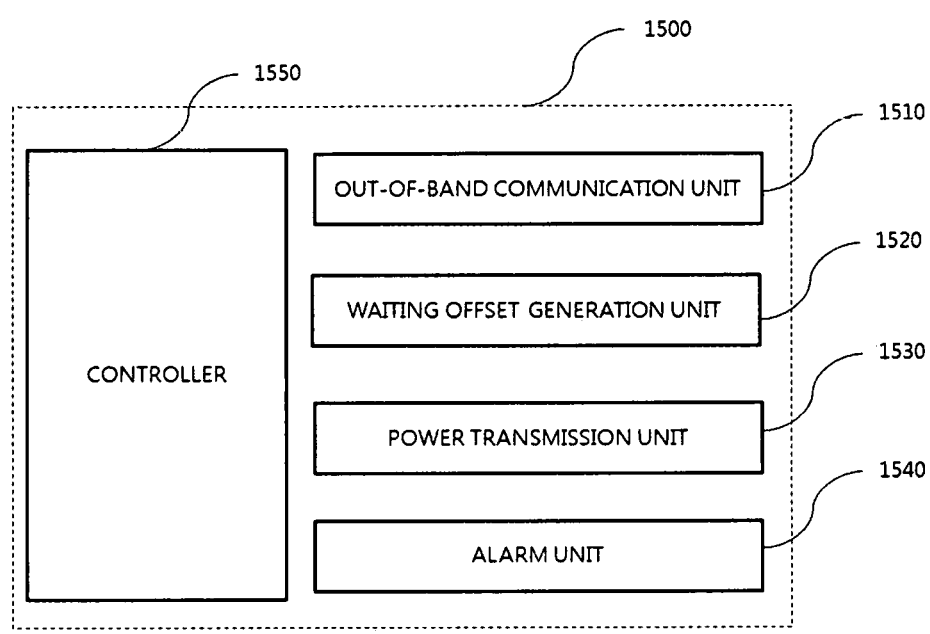
FIG. 15 is a block diagram for explanation of a structure of a wireless power transmitter according to an embodiment of the present disclosure.

As seen from the aforementioned embodiment shown in FIG. 14, the single type wireless power transmission device according to an embodiment of the present disclosure may be advantageous to prevent cross-connection when a plurality of wireless power receivers are disposed in a charging region. That is, the present disclosure may be advantageous to select an appropriate RX in the charging region of the TX1 and to charge the RX through the alert alarm signal and a detection and identification procedure after a time corresponding to the fifth waiting offset according to an embodiment. As such, the present disclosure may be advantageous to prevent unnecessary power waste and heating. FIG. 15 is a block diagram for explanation of a structure of a wireless power transmitter according to an embodiment of the present disclosure.

Referring to FIG. 15, a wireless power transmitter 1500 may include an out-of-band communication unit 1510, a waiting offset generation unit 1520, a power transmission unit 1530, an alarm unit 1540, and a controller 1550.

The out-of-band communication unit 1510 may exchange various control signals and state information with a wireless power receiver via short range wireless communication such as Bluetooth low energy (BLE) communication.

For example, the out-of-band communication unit 1510 may receive the advertisement signal and may forward the advertisement signal to the controller 1550.

The waiting offset generation unit 1520 may generate random waiting offset according to the control signal of the controller 1550. For example, the random waiting offset may be generated by a predetermined random value generation function, without being limited thereto. In addition, an initial value, i.e., a seed value, input to the random value generation function may be determined based on at least one or at least one combination of a device serial number for uniquely identifying the corresponding wireless power transmitter, manufacturing year/month/date, software version information installed in the corresponding wireless power transmitter, and a class.

The power transmission unit 1530 may generate a beacon sequence according to the control signal of the controller 1550 and may transmit the beacon sequence through an included resonance circuit. The power transmission unit 1530 may generate power for load charging of the wireless power receiver according to the control signal of the controller 1550 and may transmit the generated power to the included resonance circuit. Needless to say, intensity of the power transmitted through the resonance circuit may be adjusted according to the control signal of the controller 1550. The power transmission unit 1530 may control intensity of an AC signal transmitted through the resonance circuit by adjusting at least one of a duty rate, an operation frequency, a phase, and intensity of DC power input to an inverter.

The alarm unit 1540 may output a predetermined alert alarm indicating that cross-connection occurs according to a predetermined control signal of the controller 1550.

The alarm unit 1540 may also output a predetermined alert alarm indicating that a plurality of wireless power receives are disposed in a charging region according to a predetermined control signal of the controller 1550.

The controller 1550 may control an overall operation of the wireless power transmitter 1500.

For example, when booting is completed in the configuration state, the controller 1550 may transmit a predetermined control signal for instruction to generate waiting offset to the waiting offset generation unit 1520. The controller 1550 may control the power transmission unit 1530 to initiate a beacon sequence based on the waiting offset received from the waiting offset generation unit 1520.

As another example, upon simultaneously receiving a plurality of advertisement signals in the power save state, the controller 1550 may transmit a predetermined control signal for instruction to generate waiting offset to the waiting offset generation unit 1520. The controller 1550 may control the power transmission unit 1530 to adjust a transmission timing of a beacon signal based on the waiting offset received from the waiting offset generation unit 1520.

As another example, when the number of continuously received advertisement signals is greater than a predetermined reference value, the controller 1550 may control the alarm unit 1540 to output a predetermined alert alarm indicating that a plurality of receivers are disposed in a charging region. After outputting the alert alarm, the controller 1550 may perform control to stop power transmission of the corresponding wireless power receiver, to transition to the power save state, and to perform a wireless power receiver searching procedure. After outputting a predetermined alert alarm indicating that a plurality of receives in the power transfer state, the controller 1550 may immediately stop power transmission and, then, may drive a predetermined waiting timer. Then, when the waiting timer expires, the controller 1550 may transition to the power save state to initiate a beacon sequence.

Figure 16:
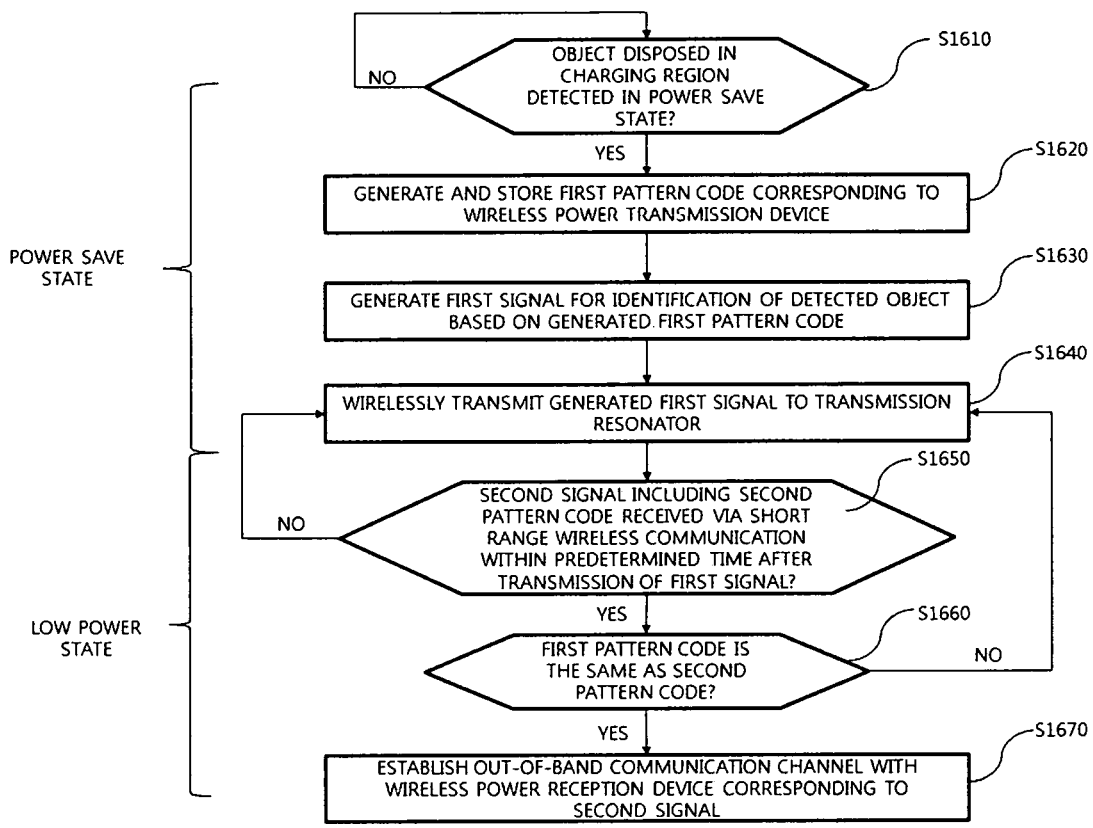
FIG. 16 is a flowchart for explanation of a method of preventing cross-connection by a wireless power transmission device according to an embodiment of the present disclosure.

FIG. 16 is a flowchart for explanation of a method of preventing cross-connection by a wireless power transmission device according to an embodiment of the present disclosure.

Referring to FIG. 16, upon detecting an object disposed in a charging region in the power save state, the wireless power transmission device may generate a specific code corresponding thereto, hereinafter referred to as a first pattern code, for convenience of description (S1610 to S1620).

For example, the first pattern code may be generated based on at least one of device identification information of the wireless power transmission device, power class information allocated to the wireless power transmission device, hardware version information or (and) firmware version information of the wireless power transmission device, and standard protocol version information. Here, the device identification information may include at least one of unique serial number information corresponding to the corresponding wireless power transmission device, manufacturer code information, and product code information. For example, the first pattern code may also be generated using a predetermined generation function using at least one of various information items corresponding to the wireless power transmission device. Here, the length and generation polynomial of the first pattern code are not limited.

The wireless power transmission device may generate a first signal for identification of the detected object based on the generated first pattern code (S1630). Here, the first signal may be a long beacon defined in the A4WP standard, without being limited thereto. For example, the wireless power transmission device may encode the first pattern code using specific coding technology, may modulate a long beacon single according to the encoded data using a predetermined modulation method and may transmit the long beacon signal.

For example, the coding technology may include a Manchester encoding method, a line coding method, and a block coding method, without being limited thereto.

For example, the modulation method may use at least one of a frequency modulation method, a phase modulation method, and an amplitude modulation method, without being limited thereto.

The wireless power transmission device may wirelessly transmit the generated first signal through a transmission resonator (S1640). In this case, a state of the wireless power transmission device may transition to the low power state from the power save state.

After transmitting the first signal, the wireless power transmission device may verify whether a second signal including a second pattern code is received via short range wireless communication within a predetermined time period (S1650). Here, the second signal may be an advertisement signal defined in the A4WP standard, without being limited thereto.

As the verification result, when the second signal is received, the wireless power transmission device may compare the first pattern code and the second pattern code (S1660).

As the comparison result, when the first pattern code and the second pattern code are the same, the wireless power transmission device may establish out-of-band communication channel with a wireless power reception device corresponding to the second signal (S1670).

As the comparison result of operation 1660, when the first pattern code and the second pattern code are not the same, the wireless power transmission device may enter operation 1640, but this is merely an embodiment and, as another example, the wireless power transmission device may enter operation 1610.

As the verification result of operation 1650, when the second signal is not received, the wireless power transmission device may enter operation 1640, but this is merely an embodiment and, as another example, the wireless power transmission device may enter operation 1610.

Figure 17:
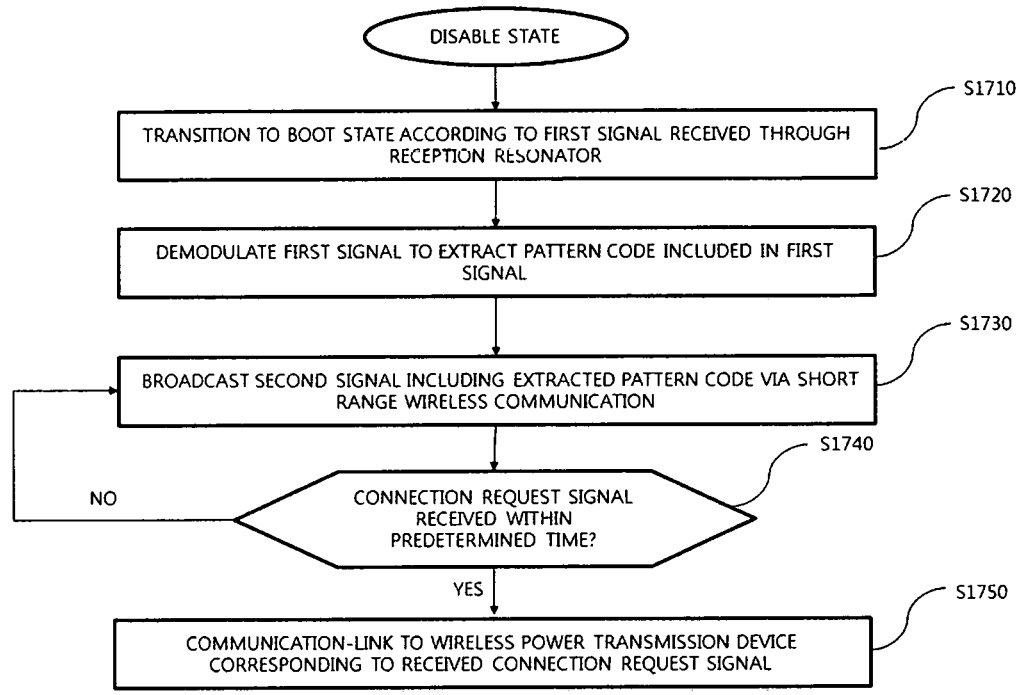
FIG. 17 is a flowchart for explanation of a method of preventing cross-connection in a wireless power reception device according to an embodiment of the present disclosure.

FIG. 17 is a flowchart for explanation of a method of preventing cross-connection in a wireless power reception device according to an embodiment of the present disclosure.

Referring to FIG. 17, the wireless power reception device may transition to the boot state according to the first signal received through a reception resonator in a disable state (S1710).

The wireless power reception device may demodulate the first signal to extract a pattern code included in the first signal (S1720). Here, the first signal may be a long beacon signal defined in the A4WP standard, without being limited thereto.

The wireless power reception device may generate a second signal including the extracted pattern code and may broadcast the generated second signal via short range wireless communication (S1730). Here, the second signal may be an advertisement signal defined in the A4WP standard, without being limited thereto.

The wireless power reception device may broadcast the second signal and, then, may verify whether the connection request signal is received within a predetermined time period (S1740).

As the verification result, upon receiving the connection request signal, the wireless power reception device may attempt a communication link with a wireless power transmission device corresponding to the received connection request signal (S1750).

According to another embodiment of the present disclosure, the wireless power reception device may also receive a plurality of first signals within a predetermined time period. In this case, the method may further include measuring signal intensity of the received first signals, e.g., a received signal strength indicator (RSSI) without being limited thereto, and identifying a first signal with largest measured signal intensity, by the wireless power reception device. In this case, the wireless power reception device may extract a pattern code corresponding to the identified first signal.

Figure 18:
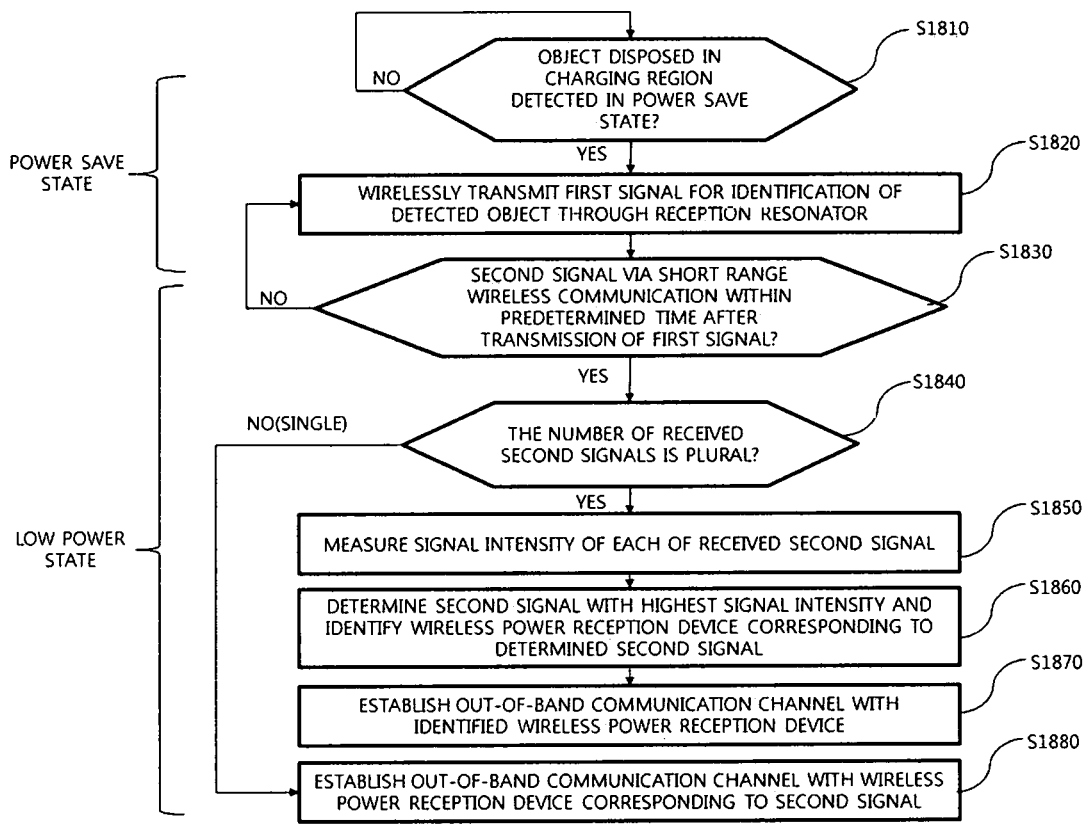
FIG. 18 is a flowchart for explanation of a method of preventing cross-connection in a wireless power transmission device according to another embodiment of the present disclosure.

FIG. 18 is a flowchart for explanation of a method of preventing cross-connection in a wireless power transmission device according to another embodiment of the present disclosure.

Referring to FIG. 18, upon detecting an object disposed in a charging region in the power save state, the wireless power transmission device may wirelessly transmit the first signal for identification of the detected object through a transmission resonator (S1810 to S1820). Here, the first signal may be transmitted through a first frequency band that is an operation frequency for wireless power transmission, for a resonance frequency.

The wireless power transmission device may transmit the first signal and, then, may verify whether the second signal is received via short range wireless communication within a predetermined time period (S1830). Here, the second signal may be transmitted through a specific second frequency band different from the first frequency band. For example, the second frequency band may be 6.78 MHz that is a frequency band of Bluetooth low energy (BLE) communication, without being limited thereto.

The wireless power transmission device may verify whether the number of second signals that are received within a predetermined time period via short range wireless communication is plural (S1840).

As the verification result, when the number is plural, the wireless power transmission device may measure signal intensity of each of the received second signals (S1850).

The wireless power transmission device may determine a second signal with highest measured signal intensity and may identify a wireless power reception device corresponding to the determined second signal (S1860).

The wireless power transmission device may establish an out-of-band communication channel with the identified wireless power reception device (S1870).

As the verification result of operation 1840, when the number of second signals received within a predetermined time period via short range wireless communication is one, i.e., a single number, the wireless power transmission device may establish an out-of-band communication channel with a wireless power reception device corresponding to the second signal (S1880).

As the verification result of operation 1830, when the second signal is not received within a predetermined time period, the wireless power transmission device may enter operation 1820, but this is merely an embodiment and, as another example, the wireless power transmission device may enter operation 1810.

As shown in FIG. 18, upon receiving the second signal, the wireless power transmission device may transition to the low power state from the power save state.

Figure 19:
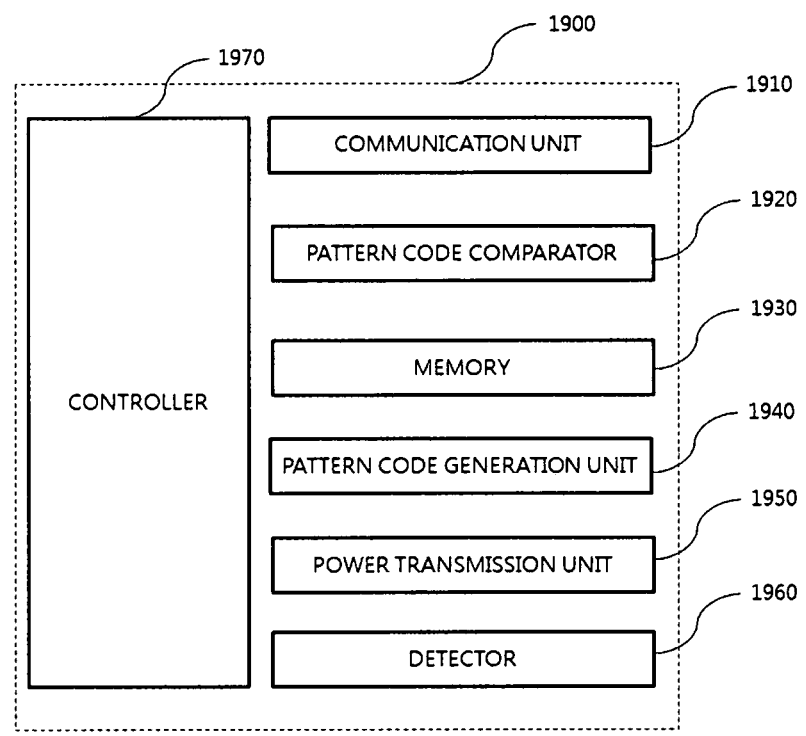
FIG. 19 is a block diagram for explanation of a structure of a wireless power transmission device according to an embodiment of the present disclosure.

FIG. 19 is a block diagram for explanation of a structure of a wireless power transmission device according to an embodiment of the present disclosure.

Referring to FIG. 19, a wireless power transmission device 1900 may include a communication unit 1910, a pattern code comparator 1920, a memory 1930, a pattern code generation unit 1940, a power transmission unit 1950, and a detector 1960.

The communication unit 1910 may transmit and receive state information and control signal to and from a wireless power receiver. The communication unit 1910 may perform out-of-band communication using a different frequency from a frequency used in wireless power transmission. For example, the out-of-band communication may be short range wireless communication. For example, the short range wireless communication may be any one of Bluetooth communication, near field communication (NFC), Wi-Fi communication, and RFID communication, without being limited thereto.

The pattern code generation unit 1940 may generate a specific code—hereinafter referred to as a first pattern code for convenience of description—corresponding to the wireless power transmission device 1900.

For example, the first pattern code may be generated based on at least one of device identification information of the wireless power transmission device, power class information allocated to the wireless power transmission device 1900, hardware version information or (and) firmware version information of the wireless power transmission device 1900, and standard protocol version information. Here, the device identification information may include at least one of unique serial number information, manufacturer code information, and product code information.

The memory 1930 may maintain various information items corresponding to the wireless power transmission device 1900, required to generate the first pattern code. The pattern code generation unit 1940 may generate the first pattern code with reference to the memory 1930.

As another example, when the wireless power transmission device 1900 is capable of acquiring current time information, the pattern code generation unit 1940 may generate the first pattern code additionally using the current time information. In this case, a further random first pattern code may be generated. The pattern code generation unit 1940 may generate the first pattern code every beacon transmission period additionally using the current time information.

The pattern code generation unit 1940 may store the generated first pattern code in a predetermined record region of the memory 1930.

The power transmission unit 1950 may convert DC power into an AC power signal and, then, may wirelessly transmit the AC power signal through an included transmission resonator.

For example, the power transmission unit 1950 may modulate a beacon signal based on the first pattern code in the power save state and may wirelessly transmit the modulated beacon signal through a transmission resonator. Here, the beacon signal modulated based on the first pattern code may be a long beacon signal.

As another example, the power transmission unit 1950 may encode the first pattern code in the power save state using predetermined coding technology. The power transmission unit 1950 may modulate the encoded data using a predetermined modulation method to generate a long beacon signal.

For example, the coding technology may include a Manchester encoding method, a line coding method, and a block coding method, without being limited thereto.

For example, the modulation method may use at least one of a frequency modulation method, a phase modulation method, and an amplitude modulation method, without being limited thereto.

When an object is disposed in a charging region, the detector 1960 may detect the object. For example, the detector 1960 may identify whether the object is disposed in the charging region based on a load change with respect to a beacon signal transmitted in the power save state, but this is merely an embodiment and, thus, may also detect the object disposed in the charging region using separately included various sensors, for example, a pressure sensor for detection of a pressure change depending on object arrangement, a capacitance sensor for detection of a change in capacitance depending on arrangement of a conductive object, and an illumination sensor for detection of an illumination change depending on object arrangement.

Upon receiving a response signal, e.g., an advertisement signal defined in the A4WP standard, corresponding to a beacon signal in the low power state, the communication unit 1910 may demodulate an advertisement signal to extract a pattern code. Hereinafter, for convenience of description, the demodulated pattern code is referred to as a second pattern code. Here, the second pattern code may be transmitted to the pattern code comparator 1920.

Upon receiving the second pattern code, the pattern code comparator 1920 may extract the first pattern code and may compare the first pattern code and the second pattern code with reference to the memory 1930.

As the comparison result, when the first pattern code and the second pattern code are the same, the pattern code comparator 1920 may transmit a predetermined first control signal indicating that the response signal is received from the wireless power receiver disposed in the charging region thereof, to the controller 1970.

Upon receiving the first control signal, the controller 1970 may establish a communication channel with the corresponding wireless power receiver in the low power state.

On the other hand, as the comparison result, when the first pattern code and the second pattern code are not the same, the pattern code comparator 1920 may transmit a predetermined second control signal indicating that a response signal is received from another wireless power receiver that is not disposed in a charging region thereof, to the controller 1970.

Upon receiving the second control signal, the controller 1970 may transition to the power save state.

The controller 1970 may perform control to supply power only to one wireless power receiver at one time. To this end, the controller 1970 may attempt a communication link with only one wireless power receiver disposed in a charging region thereof.

Figure 20:
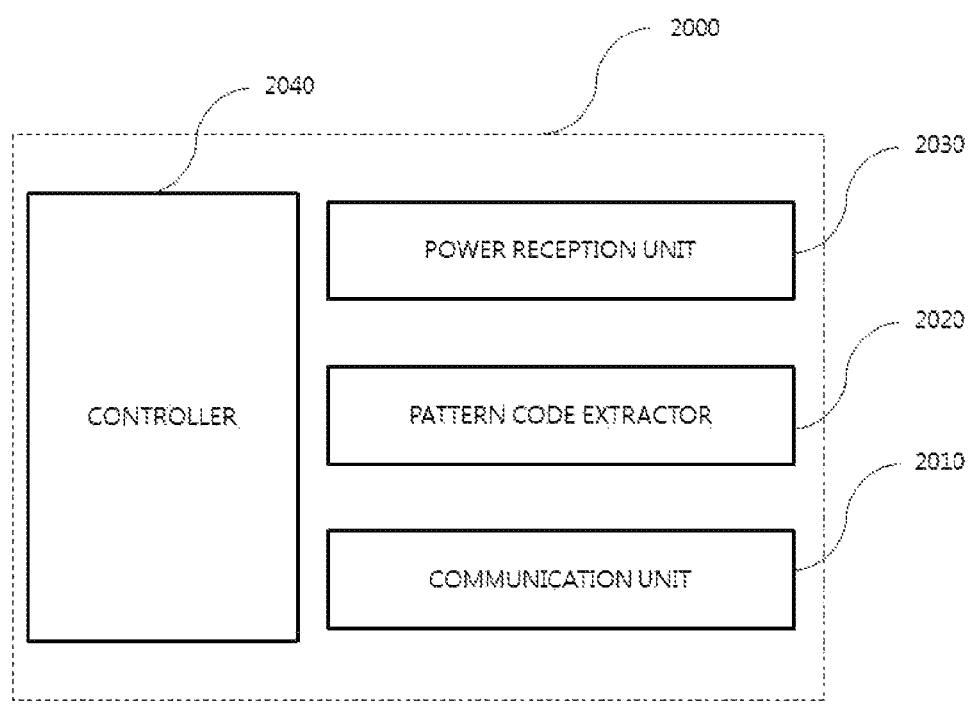
FIG. 20 is a block diagram for explanation of a structure of a wireless power reception device according to an embodiment of the present disclosure.

FIG. 20 is a block diagram for explanation of a structure of a wireless power reception device according to an embodiment of the present disclosure.

Referring to FIG. 20, a wireless power reception device 2000 may include a power reception unit 2010, a pattern code extractor 2020, a communication unit 2030, and a controller 2040.

The wireless power reception device 2000 may initiate a booting procedure when intensity of power received through the power reception unit 2010 is equal to or greater than a predetermined reference value.

When booting is completed, the controller 2040 may control the pattern code extractor 2020 to modulate the beacon signal received through the power reception unit 2010 to extract a pattern code.

The pattern code extractor 2020 may demodulate the beacon signal received through the power reception unit 2010 to extract a pattern code and may forward the extracted pattern code to the controller 2040.

The controller 2040 may generate a response signal including the extracted pattern code and may transmit the generated response signal through the communication unit 2030.

The communication unit 2030 may transmit and receive state information and control signal to and from a wireless power transmission device. The communication unit 2030 may perform out-of-band communication using a different frequency from a frequency used in wireless power transmission. For example, the out-of-band communication may be short range wireless communication. For example, the short range wireless communication may be any one of Bluetooth communication, near field communication (NFC), Wi-Fi communication, and RFID communication, without being limited thereto.

Figure 21:
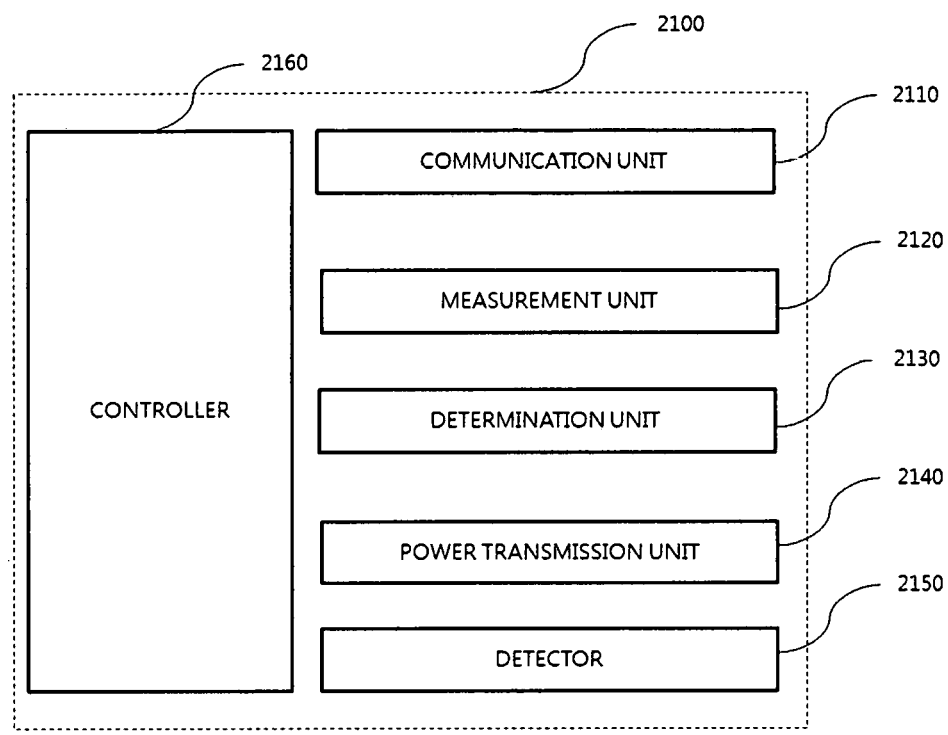
FIG. 21 is a block diagram for explanation of a structure of a wireless power transmission device according to another embodiment of the present disclosure.

FIG. 21 is a block diagram for explanation of a structure of a wireless power transmission device according to another embodiment of the present disclosure.

Referring to FIG. 21, a wireless power transmission device 2100 may include a communication unit 2110, a measurement unit 2120, a determination unit 2130, a power transmission unit 2140, a detector 2150, and a controller 2160.

The communication unit 2110 may transmit and receive state information and a control signal to and from a wireless power receiver. A description of the communication unit 2110 is replaced with the above description of FIG. 15.

The measurement unit 2120 may measure intensity of a signal received through the communication unit 2110 and may transmit the measurement result to the determination unit 2130.

For example, the measurement unit 2120 may measure a received signal strength indicator (RSSI) of a response signal (or a second signal) received through the communication unit 2110 in real time and may forward the measurement result to the determination unit 2130. The determination unit 2130 may lastly determine a wireless power receiver corresponding to a second signal with a highest RSSI value as a wireless power receiver as a communication link target. Then, upon receiving the determination result from the determination unit 2130, the controller 2160 may attempt communication link with the corresponding wireless power receiver based on the determination result.

As another example, the communication unit 2110 may also receive a plurality of second signals within a predetermined time period. In this case, the measurement unit 2120 may measure signal intensity of each of a plurality of second signals. When the measured signal intensity is RSSI, the measurement unit 2120 may forward the RSSI value measured for each second signal to the controller 2160.

The controller 2160 may identify a second signal with a highest RSSI and may attempt communication link with a wireless power receiver corresponding to the identified second signal. In general, intensity of a signal received in a wireless second may attenuate along with an increase in transition distance. Accordingly, an RSSI of a second signal transmitted by a wireless power reception device closest to the wireless power transmission device 2100 may be measured to be highest.

As described above, the wireless power transmission device 2100 according to the present embodiment may prevent communication link with a wireless power reception device disposed in a charging region of another wireless power transmission device, i.e., may prevent cross-connection.

The power transmission unit 2140 may convert DC power to an AC power signal and, then, may wirelessly transmit the AC power signal through an included transmission resonator. In particular, the power transmission unit 2140 may generate a beacon signal in the power save state and may transmit the beacon signal to the transmission resonator.

When an object is disposed in a charging region, the detector 2150 may detect the object. For example, the detector 2150 may identify whether an object is present in the charging region based on a load change of a beacon signal transmitted in the power save state, but this is merely an embodiment and, thus, may also detect the object disposed in the charging region using separately included various sensors, for example, a pressure sensor for detection of a pressure change depending on object arrangement, a capacitance sensor for detection of a change in capacitance depending on arrangement of a conductive object, and an illumination sensor for detection of an illumination change depending on object arrangement.

Upon receiving a response signal, e.g., an advertisement signal defined in the A4WP standard, corresponding to a beacon signal in the low power state, the communication unit 2110 may transmit the response single to the measurement unit 2120.

For convenience of description, a response signal corresponding to a long beacon signal for detection or identification of a wireless power receiver is interchangeably used with a second signal.

For example, upon receiving a predetermined object detection signal indicating that an object is present in a charging region from the detector 2150, the controller 2160 may control the power transmission unit 2140 to transmit a predetermined receiver detection signal (or a first signal) for identification of the detected object, for example, a long beacon signal defined in the A4WP standard. The controller 2160 may also perform control to forward all second signals received through the communication unit 2110 to the measurement unit 2120 within a predetermined time period after the receiver detection signal is transmitted.

The controller 2160 may perform control to supply power only to one wireless power receiver at one time. To this end, the controller 2160 may perform control to establish communication link with one wireless power receiver disposed in a charging region thereof.

It will be appreciated by persons skilled in the art that the effects that could be achieved with the embodiments of the present disclosure are not limited to what has been particularly described hereinabove and other advantages of the present disclosure will be more clearly understood from the detailed description taken in conjunction with the accompanying drawings.

Those skilled in the art will appreciate that the embodiments of the present disclosure may be carried out in other specific ways than those set forth herein without departing from the spirit and essential characteristics of the embodiments of the present disclosure. The above embodiments are therefore to be construed in all aspects as illustrative and not restrictive. The scope of the embodiments of the present disclosure should be determined by the appended claims and their legal equivalents, not by the above description, and all changes coming within the meaning and equivalency range of the appended claims are intended to be embraced therein.

The embodiments of the present disclosure can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy discs, optical data storage devices, etc. and the computer readable recording medium is also embodied in the form of a carrier wave (e.g., transmission through the Internet).

The computer readable recording medium can also be distributed over network coupled computer systems so that the computer readable code is stored and executed in a distributed fashion. Also, functional programs, codes, and code segments for accomplishing the embodiments of the present disclosure can be easily construed by programmers skilled in the art to which the embodiments of the present disclosure pertain.

Those skilled in the art will appreciate that the present disclosure may be carried out in other specific ways than those set forth herein without departing from the spirit and essential characteristics of the present disclosure.

It will be apparent to those skilled in the art that various modifications and variations can be made in the present disclosure without departing from the spirit or scope of the present disclosure. Thus, it is intended that the present disclosure cover the modifications and variations of the embodiment provided they come within the scope of the appended claims and their equivalents.

INDUSTRIAL APPLICABILITY

The present disclosure may be applied to a wireless charging field, in particular, a wireless power transmission device for supporting an electromagnetic resonance mode.

The invention claimed is:

1. A wireless power transmission method of a wireless power transmitter, the method comprising:
   setting a first waiting time upon receiving power;
   transmitting a first signal for detection or identification of a wireless power receiver; and
   receiving a second signal in response to the first signal,
   wherein the first waiting time is randomly set not to exceed a predefined maximum waiting time, and
   wherein the transmitting of the first signal is initiated at a time point in which the first waiting time elapses from a first specific time point.

2. The method of claim 1, wherein, when the plurality of wireless power receivers are identified, power is controlled to be supplied only to a single wireless receiver at one time point.

3. The method of claim 2, wherein the first specific time point is any one of a time point in which the power is supplied or a time point in which booting of the wireless power transmitter is completed after the power is supplied.

4. The method of claim 3, further comprising:
   receiving the second signal including identification information and feature information from the wireless power receiver;
   setting a second waiting time; and
   retransmitting the first signal,
   wherein the second waiting time is randomly set not to exceed the maximum waiting time, and
   wherein the retransmitting of the first signal is initiated at a time point when the second waiting time elapses from a second specific time point.

5. The method of claim 4, wherein the second specific time point is a time point in which the second signal is received from each of the plurality of wireless power receivers.

6. The method of claim 2, further comprising:
identifying a first wireless power receiver;
transmitting power to the identified first wireless power receiver;
receiving the second signal from a second wires power receiver;
randomly setting a third waiting time not to exceed the maximum waiting time; and
retransmitting the first signal.

7. The method of claim 6, wherein the retransmission of the first signal is initiated at a time point in which the third waiting time elapses from a third specific time point.

8. The method of claim 7, wherein the third specific time point is a time point in which the transmitting of the power to the first wireless power receiver is terminated.

9. The method of claim 8, further comprising outputting an alert alarm at the third specific time.

10. The method of claim 1, wherein the first signal includes a first pattern code corresponding to the wireless power transmitter; and
wherein upon receiving a second signal including a second pattern code, comparing the first pattern code and the second pattern code to determine a wireless power receiver as a communication link target.

11. The method of claim 10, wherein the first pattern code is generated using at least one of device identification information corresponding to the wireless power transmitter, power class information, hardware version information, firmware version information, and standard protocol version information.

12. The method of claim 10, wherein, when the first pattern code and the second pattern code are not the same, the transmitting of the first signal or detecting of an object is performed.

13. The method of claim 1, wherein the first signal and the second signal are transmitted through different frequency bands.

14. The method of claim 13, wherein measuring of signal intensity of the second signal includes:

checking whether a plurality of second signals with intensity equal to or greater than a reference value is present among the second signals received within a predetermined time after the transmitting of the first signal; and
as a result of the checking, when the plurality of second signals is present, measuring a received signal strength indicator (RSSI) corresponding to each second signal, and
wherein a wireless power receiver corresponding to a second signal with a largest RSSI is determined as a wireless power receiver as a communication link target.

15. A wireless power transmission method of a wireless power transmitter, the method comprising:
transmitting a first signal for detection or identification of a wireless power receiver;
receiving a second signal including identification information or feature information from a first wireless power receiver;
transmitting power to the first wireless power receiver;
receiving a third signal including identification information or feature information from a second wireless power receiver during power transmission to the first wireless power receiver;
setting a waiting time; and
retransmitting the first signal,
wherein the waiting time is randomly set not to exceed a predefined maximum waiting time and the retransmitting of the first signal is initiated at a time point in which the waiting time elapses from a specific time point.

16. The method of claim 15, wherein the wireless power transmitter supplies power only to a single wireless power receiver at one time point.

17. The method of claim 16, wherein the specific time point is a time point in which power transmission to the first wireless power receiver is terminated.

* * * * *